(12) United States Patent
Kobayashi

(10) Patent No.: US 8,345,525 B2
(45) Date of Patent: Jan. 1, 2013

(54) DISC RECORDING MEDIUM, DISK DRIVE APPARATUS, REPRODUCTION METHOD, AND DISK MANUFACTURING METHOD

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/366,118

(22) Filed: Feb. 3, 2012

(65) Prior Publication Data

US 2012/0137193 A1    May 31, 2012

Related U.S. Application Data

(60) Division of application No. 13/242,782, filed on Sep. 23, 2011, which is a continuation of application No. 12/578,323, filed on Oct. 13, 2009, now Pat. No. 8,064,301, which is a continuation of application No. 12/147,903, filed on Jun. 27, 2008, now Pat. No. 7,616,543, which is a continuation of application No. 10/433,756, filed as application No. PCT/JP02/10373 on Oct. 4, 2002, now Pat. No. 7,403,461.

(30) Foreign Application Priority Data

Oct. 9, 2001    (JP) .................................. 2001-311489

(51) Int. Cl.
*G11B 7/00*    (2006.01)
(52) U.S. Cl. ................. 369/59.24; 369/47.22; 369/59.25
(58) Field of Classification Search ........................ None
See application file for complete search history.

(56) References Cited

U.S. PATENT DOCUMENTS

| | | | |
|---|---|---|---|
| 5,815,486 | A | 9/1998 | Kobayashi et al. |
| 6,064,639 | A | 5/2000 | Sako et al. |
| 6,304,971 | B1 | 10/2001 | Kutaragi et al. |
| 6,367,049 | B1 | 4/2002 | Van Dijk et al. |
| 6,532,201 | B1 | 3/2003 | Hogan |
| 6,582,793 | B2 | 6/2003 | Kondo |
| 6,661,758 | B2 | 12/2003 | Sako et al. |
| 6,898,172 | B2 | 5/2005 | Fairman et al. |
| 6,917,572 | B2 | 7/2005 | Lida et al. |
| 7,028,011 | B1 | 4/2006 | Ha et al. |
| 2001/0005357 | A1 | 6/2001 | Ha et al. |

(Continued)

FOREIGN PATENT DOCUMENTS

EP    0 299 573 A1    1/1989

(Continued)

OTHER PUBLICATIONS

Office Action issued Jan. 16, 2012 in European Patent Application No. 02 800 774.8.

(Continued)

*Primary Examiner* — Adam R Giesy
(74) *Attorney, Agent, or Firm* — Oblon, Spivak, McClelland, Maier & Neustadt, L.L.P.

(57) ABSTRACT

A recording and reproducing area and a reproduction-only area are formed by wobbling a groove formed in a spiral fashion to form a track to be tracked on a disk. The recording and reproducing area has address information recorded by wobbling of the groove and information recorded and reproduced by phase change marks on the track formed by the groove where the address information is recorded. The reproduction-only area has prerecorded information recorded by wobbling of the groove.

5 Claims, 25 Drawing Sheets

U.S. PATENT DOCUMENTS

| | | |
|---|---|---|
| 2002/0006084 A1 | 1/2002 | Kawashima et al. |
| 2002/0012299 A1 | 1/2002 | Asano |
| 2002/0044511 A1 | 4/2002 | Sako et al. |
| 2002/0067676 A1 | 6/2002 | Inokuchi et al. |
| 2002/0136126 A1 | 9/2002 | Maegawa |
| 2003/0002427 A1 | 1/2003 | Lee et al. |
| 2003/0012110 A1* | 1/2003 | Senshu ................. 369/59.13 |

FOREIGN PATENT DOCUMENTS

| | | |
|---|---|---|
| EP | 0 397 238 A1 | 11/1990 |
| EP | 0 414 516 A2 | 2/1991 |
| EP | 0 973 158 A2 | 1/2000 |
| EP | 0 973 175 B1 | 1/2000 |
| EP | 1 255 245 A2 | 11/2002 |
| JP | 58-169341 | 10/1983 |
| JP | 61-029455 | 2/1986 |
| JP | 61-168173 | 7/1986 |
| JP | 64-039632 | 2/1989 |
| JP | 2-50361 | 2/1990 |
| JP | 3-083226 | 4/1991 |
| JP | 3-83226 | 4/1991 |
| JP | 3-181023 | 8/1991 |
| JP | 04-026959 | 1/1992 |
| JP | 4-357737 | 12/1992 |
| JP | 5-36087 | 2/1993 |
| JP | 5-036087 | 2/1993 |
| JP | 5-102958 | 4/1993 |
| JP | 5-325193 | 12/1993 |
| JP | 6-076363 | 3/1994 |
| JP | 7-21697 | 1/1995 |
| JP | 8-147704 | 6/1996 |
| JP | 08-212715 | 8/1996 |
| JP | 9-69230 | 3/1997 |
| JP | 3063662 | 9/1997 |
| JP | 10-320784 | 12/1998 |
| JP | 11-149644 | 6/1999 |
| JP | 2000-311448 | 11/2000 |
| JP | 2001-23351 | 1/2001 |
| JP | 2001-135022 | 5/2001 |
| JP | 2001-167446 | 6/2001 |
| JP | 2001-313819 | 11/2001 |
| JP | 2002-521789 | 7/2002 |
| JP | 2002-535801 | 10/2002 |
| WO | WO 00/07300 | 2/2000 |
| WO | WO 00/45381 | 8/2000 |

OTHER PUBLICATIONS

Huijer A: "Materials for On-line Optical Recording" in: Bouwhuis G et al.: "Principles of Optical Disc Systems", 1985, Adam Hilger Ltd, ISBN: 0-85274-785-3, pp. 210-227.

Office Action issued Nov. 29, 2011, in Japanese Patent Application No. 2010-113044 (with English translation).

Office Action issued Aug. 30, 2011, in Japanese Patent Application No. 2010-113044, pp. 1-2 (w/o English Translation).

Kees Schep et al., "Format Description and Evalutaion of the 22.5 GB Digital-Video-Recording Disc", Japanese Journal of Applied Physics, vol. 40, No. 3B, Part 1, XP-001038396, Mar. 2001, pp. 1813-1816.

J.G. Proakis, "Digital Communication", XP-002042235, 1989, pp. 163-165.

Supplementary European Search Report, Mar. 14, 2006 (EP 03 80 0774).

Tatsuya Narahara et al., "Optical Disc System for Digital Video Recording", Jpn, J. Appl. Phys., XP-001005912, vol. 39, No. 2B, pp. 912-919.

Maarten Kuijer et al., "Groove-only recording under DVR conditions", Proceedings of SPIE, XP002371452, vol. 4342, 2002, pp. 178-185.

Japanese Office Action issued Aug. 7, 2012 in Japanese Application No. 2010-113044 filed May 20, 2010 (without English Translation).

* cited by examiner

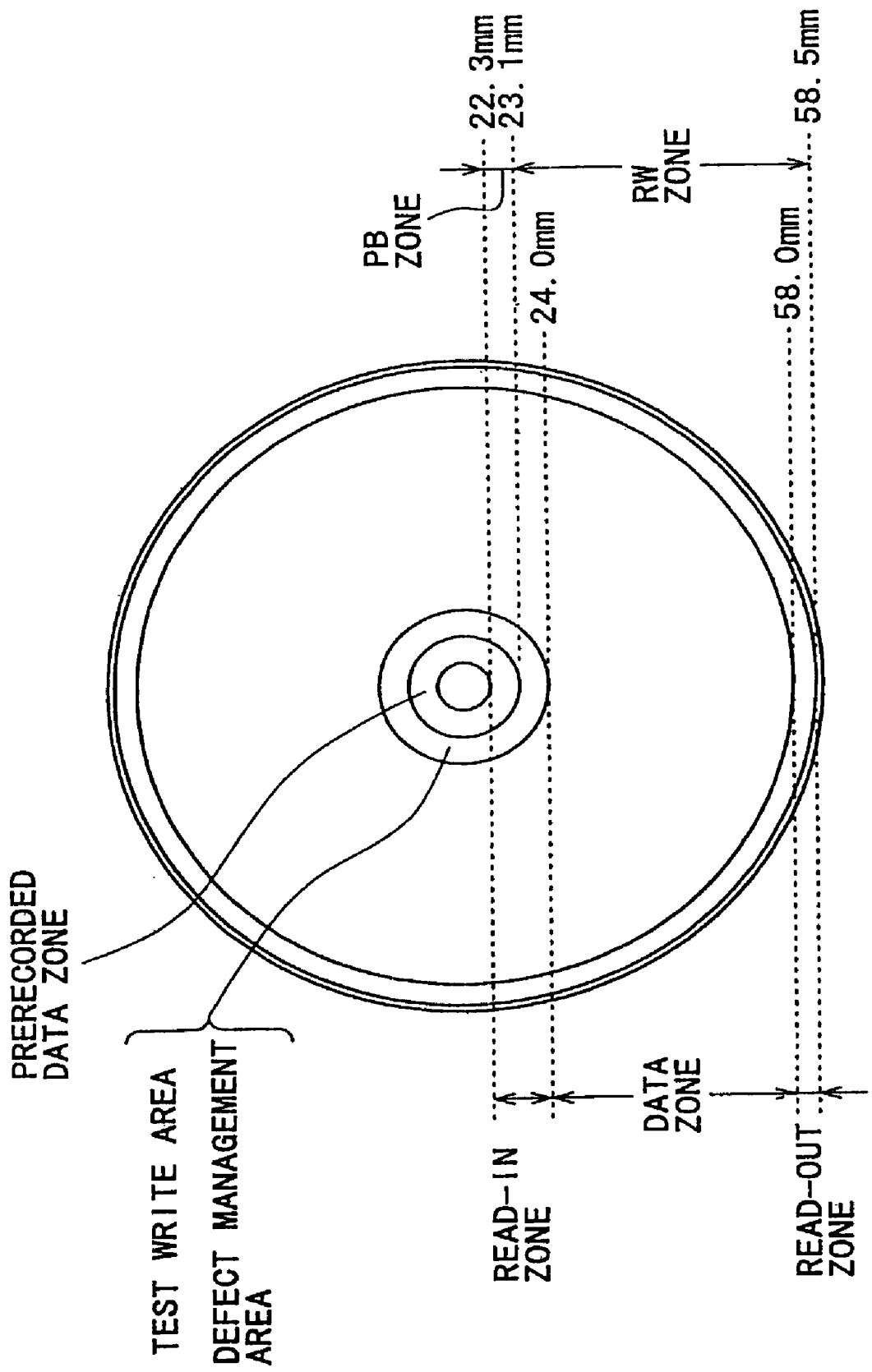

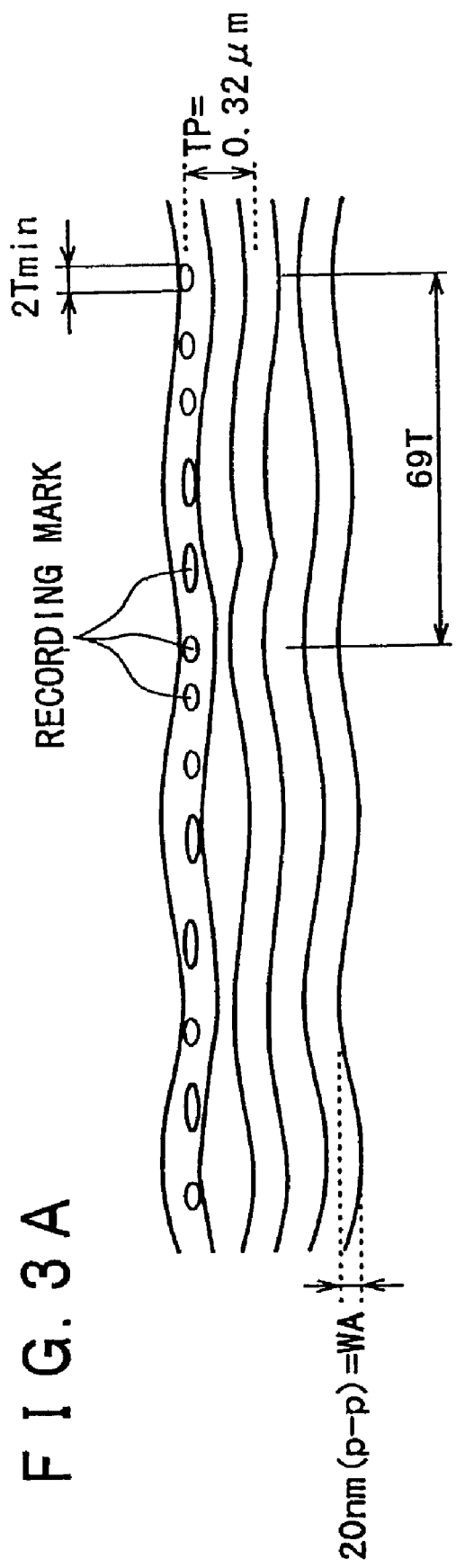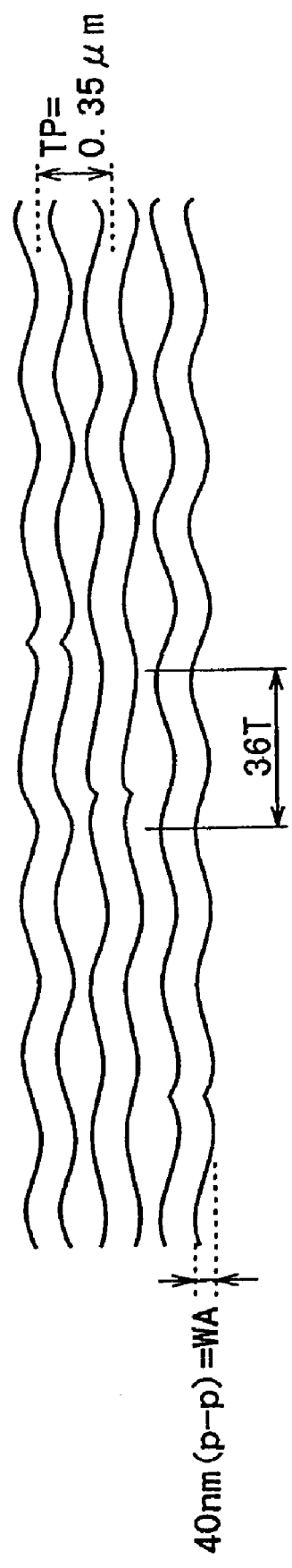

FIG. 4

| | | "1" | "0" |
|---|---|---|---|
| FIG. 4(a) | DATA BIT | | |
| FIG. 4(b) | CHANNEL CLOCK | ⊓⊓⊓ | ⊓⊓⊓ |
| FIG. 4(c) | FM CODE | ⊓_⊔ | ⊓ |
| FIG. 4(d) | WOBBLE WAVEFORM | ∧∨ | ∧ |
| FIG. 4(e) | FM CODE | ⊔⊓ | ⊔ |
| FIG. 4(f) | WOBBLE WAVEFORM | ∨∧ | ∨ |

FIG. 4(g) DATA BIT STREAM    1 0 1 1 0 0 1 0

FIG. 4(h) FM CODE WAVEFORM

FIG. 4(i) WOBBLE WAVEFORM

OR

FIG. 4(j) FM CODE WAVEFORM

FIG. 4(k) WOBBLE WAVEFORM

F I G. 6A
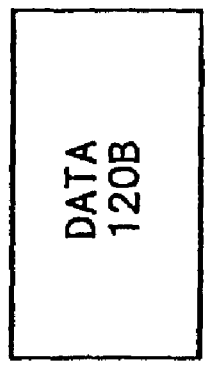
DATA
4kB (=2048X2)
F I G. 6B
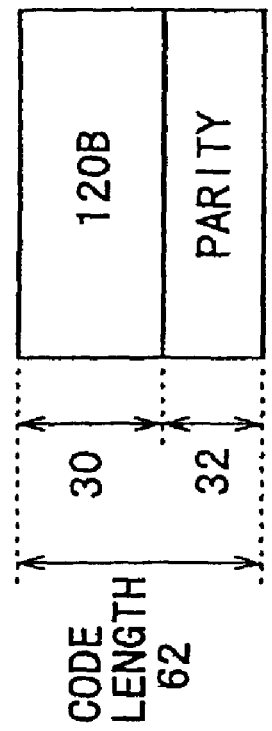
(2048+4) X2B
PARITY
216    32
CODE LENGTH 248
F I G. 6C
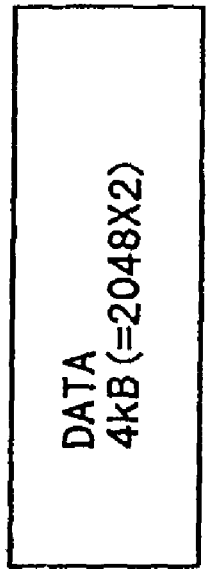
DATA
120B
F I G. 6D
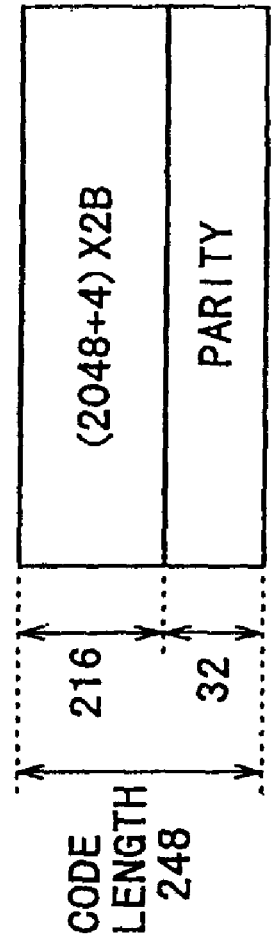
120B
PARITY
30    32
CODE LENGTH 62

F I G. 8

| SYNC NUMBER | DATA | SYNC BODY | SYNC ID | SYNC ID | |
|---|---|---|---|---|---|
| | | | | DATA BIT | PARITY BIT |
| FS0 | 1X | 11001001 | 10101010 | 000 | 0 |
| FS1 | 1X | 11001001 | 10101111 | 001 | 1 |
| FS2 | 1X | 11001001 | 10111011 | 010 | 1 |
| FS3 | 1X | 11001001 | 10111110 | 011 | 0 |
| FS4 | 1X | 11001001 | 11101011 | 100 | 1 |
| FS5 | 1X | 11001001 | 11101110 | 101 | 0 |
| FS6 | 1X | 11001001 | 11111010 | 110 | 0 |

FIG. 9

| FRAME NUMBER | FRAME SYNC | FRAME NUMBER | FRAME SYNC |
|---|---|---|---|
| 0 | FS0 | | |
| 1 | FS1 | 16 | FS5 |
| 2 | FS2 | 17 | FS3 |
| 3 | FS3 | 18 | FS2 |
| 4 | FS3 | 19 | FS2 |
| 5 | FS1 | 20 | FS5 |
| 6 | FS4 | 21 | FS6 |
| 7 | FS1 | 22 | FS5 |
| 8 | FS5 | 23 | FS1 |
| 9 | FS5 | 24 | FS1 |
| 10 | FS4 | 25 | FS6 |
| 11 | FS3 | 26 | FS2 |
| 12 | FS4 | 27 | FS6 |
| 13 | FS6 | 28 | FS4 |
| 14 | FS6 | 29 | FS4 |
| 15 | FS3 | 30 | FS2 |

FIG. 10A

| | #0 | #1 | #2 | #3 | #4 | #5 | #6 | #7 |
|---|---|---|---|---|---|---|---|---|
| 0 | A0-0 | A1-0 | A2-0 | A3-0 | A4-0 | A5-0 | A6-0 | A7-0 |
| 1 | A0-1 | A1-1 | A2-1 | A3-1 | A4-1 | A5-1 | A6-1 | A7-1 |
| 2 | A0-2 | A1-2 | A2-2 | A3-2 | A4-2 | A5-2 | A6-2 | A7-2 |
| 3 | A0-3 | A1-3 | A2-3 | A3-3 | A4-3 | A5-3 | A6-3 | A7-3 |
| 4 | A0-4 | A1-4 | A2-4 | A3-4 | A4-4 | A5-4 | A6-4 | A7-4 |
| 5 | A0-5 | A1-5 | A2-5 | A3-5 | A4-5 | A5-5 | A6-5 | A7-5 |
| 6 | A0-6 | A1-6 | A2-6 | A3-6 | A4-6 | A5-6 | A6-6 | A7-6 |
| 7 | A0-7 | A1-7 | A2-7 | A3-7 | A4-7 | A5-7 | A6-7 | A7-7 |
| 8 | A0-8 | A1-8 | A2-8 | A3-8 | A4-8 | A5-8 | A6-8 | A7-8 |

9 BYTES × 8 ADDRESS FIELDS

FIG. 10B

| | #0 | #1 |
|---|---|---|
| 0 | UC0-0 | UC1-0 |
| 1 | UC0-1 | UC1-1 |
| 2 | UC0-2 | UC1-2 |
| 3 | UC0-3 | UC1-3 |
| ... | ... | ... |
| 23 | UC0-23 | UC1-23 |

24 BYTES × 2 UNITS

FIG. 13

NUMBER : ROW NUMBER

▨▨▨ ADDRESS UNIT #( )

BIS CLUSTER

| 0 | 93 | 62 | 31 |
|---|---|---|---|
| 124 | | | |
| 32 | 1 | 94 | 63 |
| | 125 | | |
| 64 | 33 | 2 | 95 |
| | | 126 | |
| 96 | 65 | 34 | 3 |
| | | | 127 |

| | 13 | | |
|---|---|---|---|
| | | 14 | |
| | | | |
| | | | 15 |
| | | | |
| 16 | | | |

| 244 | | | |
|---|---|---|---|
| 28 | | | |
| | 245 | | |
| | 29 | | |
| | | 246 | |
| 92 | 61 | 30 | 123 |
| | | | 247 |

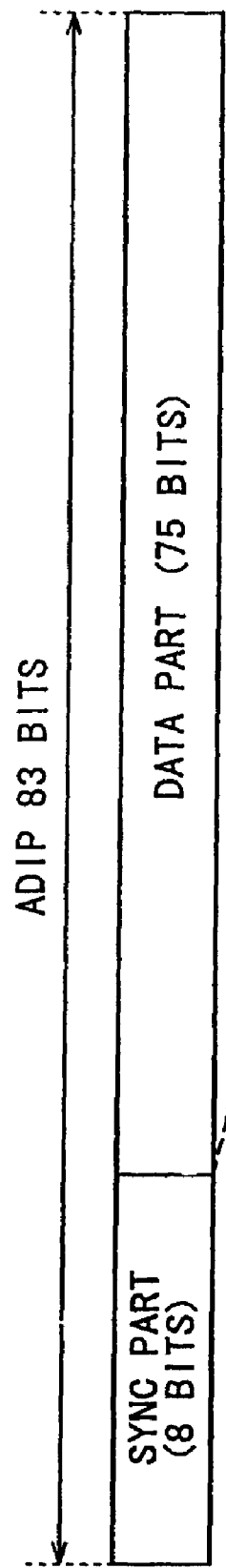
F I G. 1 7 A
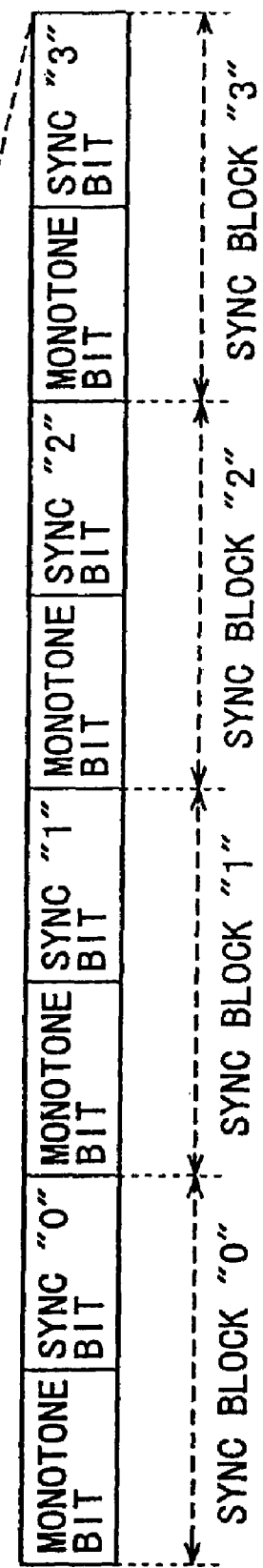
F I G. 1 7 B

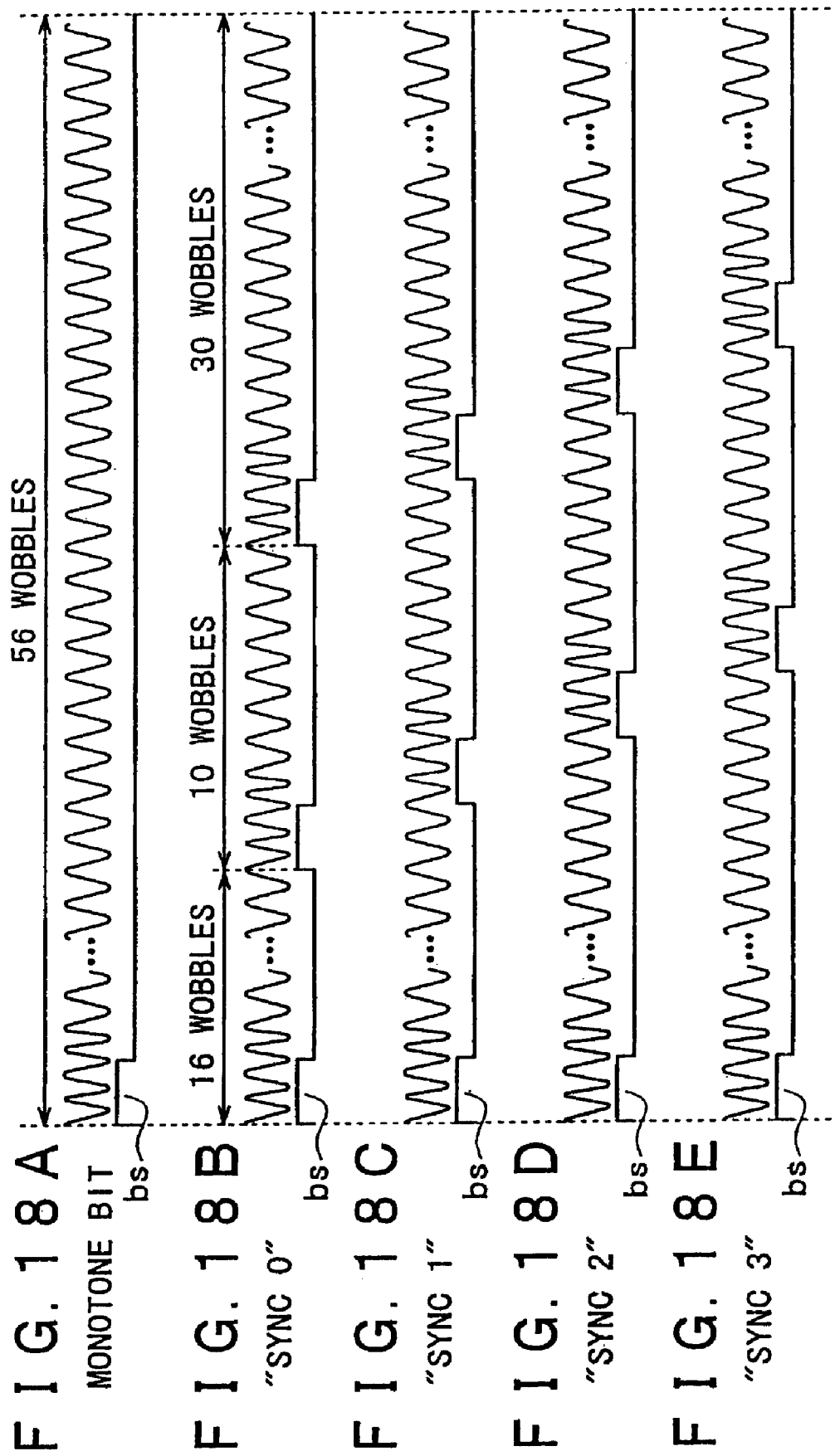

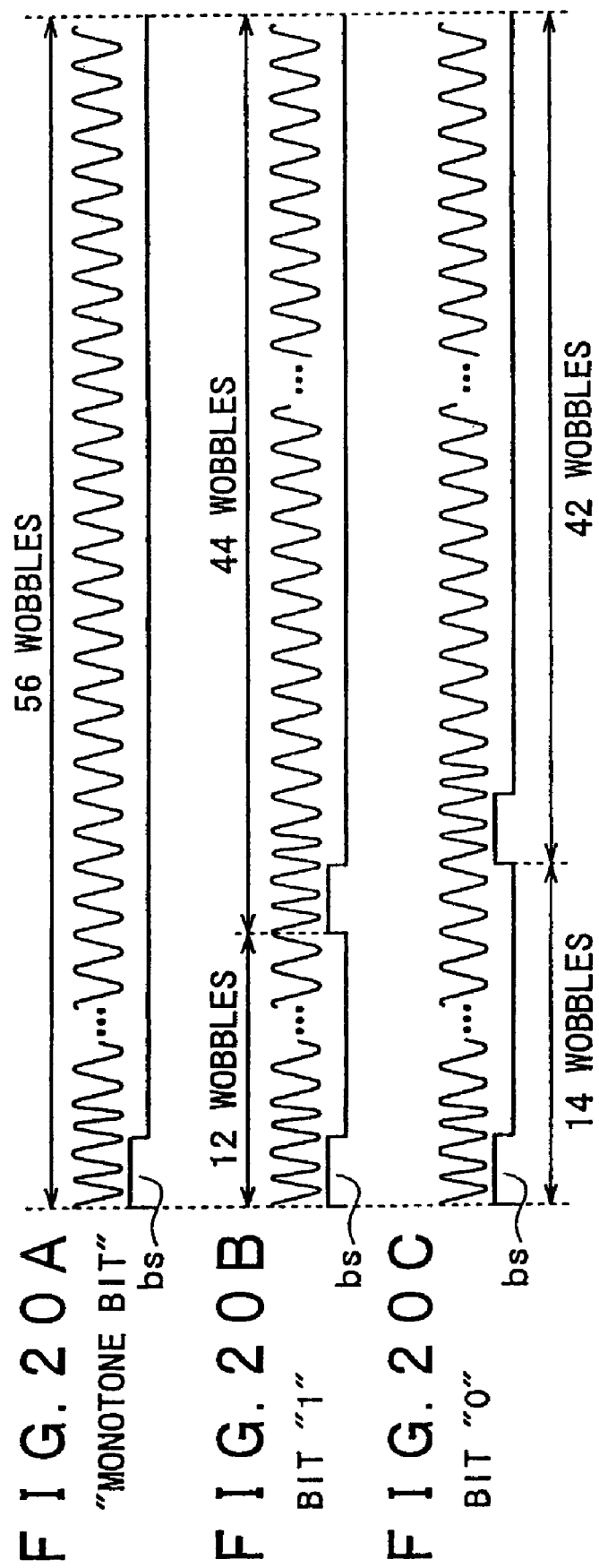

FIG. 21

| | | | | |
|---|---|---|---|---|
| NIBBLE 0 | LAYER NO. BIT 2 | LAYER NO. BIT 1 | LAYER NO. BIT 0 | ADIP ADDRESS 6 NIBBLES |
| NIBBLE 1 | RUB NO. BIT 17 | RUB NO. BIT 16 | RUB NO. BIT 18 | |
| NIBBLE 2 | RUB NO. BIT 13 | RUB NO. BIT 12 | RUB NO. BIT 14 | |
| NIBBLE 3 | RUB NO. BIT 9 | RUB NO. BIT 8 | RUB NO. BIT 10 | |
| NIBBLE 4 | RUB NO. BIT 5 | RUB NO. BIT 4 | RUB NO. BIT 6 | |
| NIBBLE 5 | RUB NO. BIT 1 | RUB NO. BIT 0 | RUB NO. BIT 2 | |
| NIBBLE 6 | RESERVE BIT 11 | RESERVE BIT 10 | ADDRESS NO. BIT 1 | ADDRESS NO. BIT 0 | AUX DATA 3 NIBBLES |
| NIBBLE 7 | RESERVE BIT 7 | RESERVE BIT 6 | RESERVE BIT 9 | RESERVE BIT 8 | |
| NIBBLE 8 | RESERVE BIT 3 | RESERVE BIT 2 | RESERVE BIT 5 | RESERVE BIT 4 | |
| NIBBLE 9 | PARITY BIT 23 | PARITY BIT 22 | RESERVE BIT 1 | RESERVE BIT 0 | NIBBLE-BASED ID-RS ECC 6 NIBBLES |
| NIBBLE 10 | PARITY BIT 19 | PARITY BIT 18 | PARITY BIT 21 | PARITY BIT 20 | |
| NIBBLE 11 | PARITY BIT 15 | PARITY BIT 14 | PARITY BIT 17 | PARITY BIT 16 | |
| NIBBLE 12 | PARITY BIT 1 | PARITY BIT 10 | PARITY BIT 13 | PARITY BIT 12 | |
| NIBBLE 13 | PARITY BIT 7 | PARITY BIT 6 | PARITY BIT 9 | PARITY BIT 8 | |
| NIBBLE 14 | PARITY BIT 3 | PARITY BIT 2 | PARITY BIT 5 | PARITY BIT 4 | |

DATA 9 NIBBLES

PARITY 6 NIBBLES

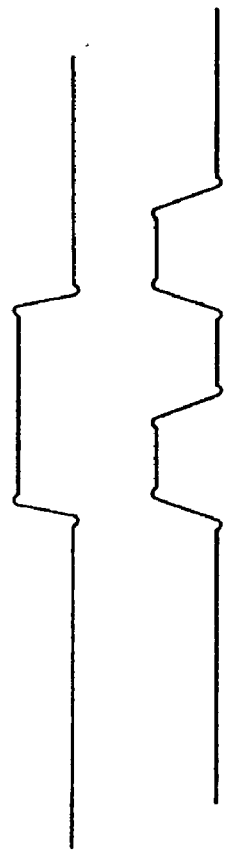
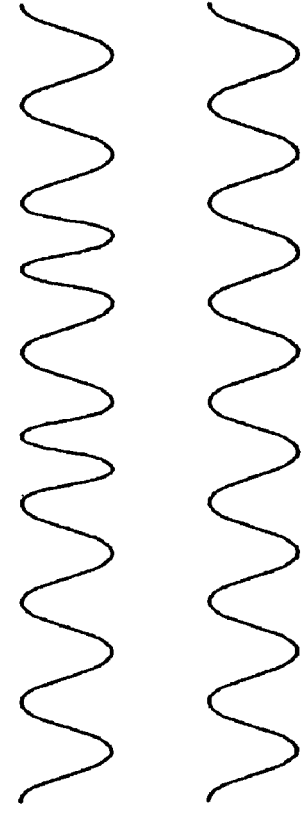
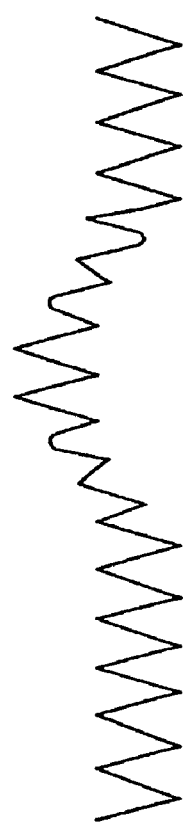
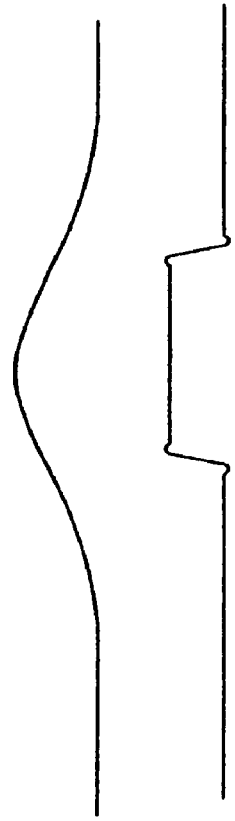
FIG. 24A DATA
FIG. 24B PRECODED DATA
FIG. 24C MSK
FIG. 24D CARRIER
FIG. 24E DEMODULATED SIGNAL
FIG. 24F LPF OUTPUT
FIG. 24G DEMODULATED DATA

DISC RECORDING MEDIUM, DISK DRIVE APPARATUS, REPRODUCTION METHOD, AND DISK MANUFACTURING METHOD

CROSS-REFERENCE TO RELATED APPLICATION

This application is a divisional application of U.S. application Ser. No. 13/242,782, filed on Sep. 23, 2011, which is a continuation application of U.S. application Ser. No. 12/578,323, filed on Oct. 13, 2009, now U.S. Pat. No. 8,064,301, which is a continuation application of U.S. application Ser. No. 12/147,903, filed on Jun. 27, 2008, now U.S. Pat. No. 7,616,543, which is a continuation application of U.S. application Ser. No. 10/433,756, filed on May 21, 2004, now U.S. Pat. No. 7,403,461, which is a National Stage application of PCT/JP02/10373, filed on Oct. 4, 2002, and claims priority to Japanese Patent Application No 2001-311489, filed on Oct. 9, 2001. The entire contents of the above-identified applications are incorporated herein by reference.

TECHNICAL FIELD

The present invention relates to a disk recording medium such as an optical disk or the like, a disk manufacturing method for manufacturing the disk recording medium, and a disk drive apparatus and a reproducing method for the disk recording medium, and particularly to a disk having a track wobbled as a pregroove.

BACKGROUND ART

As technology for recording and reproducing digital data, there is a data recording technology using optical disks (including magneto-optical disks) such for example as CD (Compact Disk), MD (Mini-Disk), and DVD (Digital Versatile Disk) for recording media. The optical disk is a generic term for recording media that are disks having a metallic thin plate protected with plastic and irradiated with laser light to read a signal through change in the reflected light.

Optical disks for example include reproduction-only types known as CD, CD-ROM, DVD-ROM and the like and user data recordable types known as MD, CD-R, CD-RW, DVD-R, DVD-RW, DVD+RW, DVD-RAM and the like. The recordable types allow data to be recorded thereon by using a magneto-optic recording method, a phase change recording method, a dye film change recording method and the like. The dye film change recording method is also referred to as a write-once recording method, which allows data recording only once and does not allow rewriting. The dye film change recording method is therefore suitable for data storing purposes and the like.

On the other hand, the magneto-optic recording method and the phase change recording method allow data rewriting, and are used for various purposes including recording of various contents data such as music, video, games, application programs and the like.

To record data on a recordable disk by the magneto-optic recording method, the dye film change recording method, the phase change recording method or the like requires guiding means for tracking a data track. Thus, a groove is formed in advance as a pregroove, and the groove or a land (a portion of trapezoidal cross section sandwiched between grooves) is used as a data track.

It is also necessary to record address information so that data can be recorded at predetermined positions on the data track. The address information may be recorded by wobbling the groove.

Specifically, the track for recording data is formed in advance as a pregroove, for example, and side walls of the pregroove are wobbled in correspondence with the address information.

This makes it possible to read addresses from wobbling information obtained as reflected light information at the time of recording and reproduction and therefore record and reproduce data at desired positions even when for example pit data or the like indicating addresses is not formed in advance on the track.

Thus adding the address information as a wobbling groove eliminates the need for providing for example discrete address areas on the track and recording addresses as pit data, for example. Since the address areas are not required, real data recording capacity can be correspondingly increased. Incidentally, absolute time (address) information represented by such a wobbled groove is referred to as ATIP (Absolute Time In Pregroove) or ADIP (Address In Pregroove).

Recently, it has become necessary to record various information on the disk in advance, as with the address information, in addition to the address information and information recorded and reproduced by the user.

Specifically, as prerecorded information recorded on the disk in advance, disk information indicating conditions for recording on the disk, for example a recording linear velocity, a recommended value of laser power and the like, and copy protect information for excluding hacked apparatus and the like are desired to be recorded. The copy protect information is particularly important.

A known method for prerecording various information on the disk is to form embossed pits on the disk.

Considering high-density recording and reproduction on an optical disk, however, the method of prerecording by embossed pits is disadvantageous.

High-density recording and reproduction on an optical disk requires a reduction in groove depth. In the case of a disk having a groove and embossed pits produced simultaneously by a stamper, it is very difficult to make depth of the groove and depth of the embossed pits different from each other. Thus, the depth of the embossed pits has to be the same as the depth of the groove.

However, when the depth of the embossed pits is reduced, a signal of good quality cannot be obtained from the embossed pits.

For example, a volume of 23 GB (gigabytes) can be recorded and reproduced on an optical disk 12 cm in diameter by recording and reproducing phase change marks at a track pitch of 0.32 µm and a linear density of 0.12 µm/bit on a disk having a cover (substrate) thickness of 0.1 mm, using a laser diode having a wavelength of 405 nm and an objective lens having an NA=0.85 as an optical system.

In this case, the phase change marks are recorded and reproduced on a groove formed in a spiral fashion on the disk. In order to suppress media noise for higher density, a groove depth of about 20 nm, that is, $1/13$ to $1/12$ of a wavelength $\lambda$ is desirable.

In order to obtain a signal of good quality from embossed pits, on the other hand, a depth of the embossed pits is desired to be $\lambda/8$ to $\lambda/4$. After all, a good solution as a common depth of the groove and the embossed pits has not been obtained.

Because of such a situation, a method of prerecording information by other than embossed pits is desired.

DISCLOSURE OF INVENTION

On a disk recording medium according to the present invention, a recording and reproducing area and a reproduction-only area are formed by wobbling a groove formed in a spiral fashion to form a track to be tracked on the disk. The recording and reproducing area has address information recorded by wobbling of the groove and information recorded and reproduced by phase change marks on the track formed by the groove where the address information is recorded. The reproduction-only area has prerecorded information recorded by wobbling of the groove.

This eliminates the need for recording the prerecorded information by embossed pits. Since it is not necessary to form embossed pits, the depth of the groove can be reduced. That is, the depth of the groove can be set to an optimum state for high-density recording without regard for reproduction characteristics of the embossed pits. Thus high-density recording that realizes a capacity of 23 GB or the like on a disk 12 cm in diameter, for example, is made possible.

A disk drive apparatus can reproduce the prerecorded information (extract wobble information) by the same wobble channel reproducing system for the address information (ADIP).

Further, by recording copy protect information as the prerecorded information by the wobbling groove instead of forming embossed pits, it is possible to construct a storage system suitable as a system for recording and reproducing a video signal, an audio signal and the like.

The reproduction-only area does not have information recorded by phase change marks. Since phase change marks can be said to convert high reflectivity of a recording layer into low reflectivity, a track having phase change marks recorded thereon is decreased in average reflectivity. That is, returned light is reduced, which is disadvantageous in terms of SNR (Signal Noise Ratio) for extraction of a wobbling component of the groove. According to the present invention, by not recording phase change marks in the reproduction-only area, it is possible to prevent degradation in the SNR of the prerecorded information and thereby obtain a wobbling signal of good quality.

Further, linear density of the prerecorded information recorded in the reproduction-only area is lower than linear density of the information represented by phase change marks in the recording and reproducing area and is higher than linear density of the address information in the recording and reproducing area.

By making the recording linear density of the prerecorded information lower than the recording linear density of the phase change marks, it is possible to reproduce with good quality a wobbling signal that is obtained from a push-pull signal and is inferior in SNR to the phase change marks.

Further, by making the recording linear density of the prerecorded information higher than the linear density of the address information (ADIP), it is possible to raise a transfer rate and shorten reproduction time.

The prerecorded information is modulated by an FM code and recorded. It is thereby possible to narrow a band of the signal and thus improve the SNR. Further, both a PLL and a detection circuit can be formed by simple hardware.

An ECC (error correction code) format of the prerecorded information uses the same code and structure as an ECC format of the information recorded by phase changes. Thus the same hardware can be used for ECC processing of the prerecorded information and the phase change information, thereby promoting a reduction in cost of the disk drive apparatus and simplification of configuration of the disk drive apparatus.

Error correction code including address information is added to the prerecorded information. The disk drive apparatus can thereby perform access/reproduction operation properly on the basis of the address in the reproduction-only area.

A synchronizing signal of the prerecorded information has a plurality of synchronizing signals. Each of the synchronizing signals comprises a pattern out of rules of modulation of the information and an identification pattern for identifying the synchronizing signal. The identification pattern is obtained by modulating an identification number and an even parity bit of the identification number by an FM code.

This makes it easier to determine the position of each of the synchronizing signals even in the middle of an ECC block and detect an address within the ECC block. When identifying each synchronizing signal pattern among a plurality of synchronizing signal patterns, the synchronizing signal pattern is identified by difference in the identification pattern, and also a parity check is performed, whereby the identification pattern can be checked for correctness and thus each of the synchronizing signals can be identified with higher accuracy.

Thus, the present invention is suitable for a large-capacity disk recording medium, and great effects are obtained in that the disk drive apparatus is improved in recording and reproducing operation performance and the wobble processing circuit system may be a simple one.

BRIEF DESCRIPTION OF DRAWINGS

FIG. 2 is a diagram of assistance in explaining an area structure of the disk according to the embodiment;

FIG. 3A is a diagram of assistance in explaining a method of wobbling a groove in a track of an RW zone of the disk according to the embodiment, and FIG. 3B is a diagram of assistance in explaining a method of wobbling a groove in a track of a PB zone;

FIGS. 4(a) to 4(k) are diagrams of assistance in explaining a method of modulation of prerecorded information according to the embodiment;

FIGS. 6A to 6D are diagrams of assistance in explaining an ECC structure of prerecorded information according to the embodiment;

FIG. 8 is a diagram of assistance in explaining frame syncs of the prerecorded information according to the embodiment;

FIG. 9 is a diagram of assistance in explaining a frame sync arrangement of the prerecorded information according to the embodiment;

FIG. 10A is a diagram of assistance in explaining address fields in a BIS of the prerecorded information according to the embodiment, and FIG. 10B is a diagram of assistance in explaining user control data;

FIG. 13 is a diagram of assistance in explaining a BIS structure of the prerecorded information according to the embodiment;

FIGS. 17A and 17B are diagrams of assistance in explaining a sync part of the disk according to the embodiment;

FIGS. 18A to 18E are diagrams of assistance in explaining sync bit patterns of the disk according to the embodiment;

FIGS. 20A, 20B, and 20C are diagrams of assistance in explaining ADIP bit patterns of the disk according to the embodiment;

FIG. 21 is a diagram of assistance in explaining an ECC structure of the ADIP information according to the embodiment;

FIGS. 24A to 24G are diagrams of assistance in explaining MSK demodulation processing of the disk drive apparatus according to the embodiment.

BEST MODE FOR CARRYING OUT THE INVENTION

An optical disk according to an embodiment of the present invention will hereinafter be described, and also a disk drive apparatus (recording and reproducing apparatus) and a manufacturing method provided for the optical disk will be described in the following order.
1. Disk
1-1. Physical Characteristics of Optical Disk
1-2. Prerecorded Information
1-3. ADIP Address
2. Disk Drive Apparatus
3. Disk Manufacturing Method
1. Disk
1-1. Physical Characteristics of Optical Disk Physical characteristics of a disk according to the embodiment and a wobbling track will first be described.

The optical disk in this example belongs to a category of disks recently developed under a name of DVR (Data&Video Recording) disks, for example, and particularly has a new wobbling system as a DVR system.

Data is recorded on the optical disk in this example by a phase change method. As to disk size, the optical disk is 120 mm in diameter. The optical disk has a disk thickness of 1.2 mm. Thus, in these respects, the optical disk is similar to a disk of a CD (Compact Disc) type and a disk of a DVD (Digital Versatile Disc) type in terms of outward appearance.

Laser wavelength for recording/reproduction is 405 nm. A so-called blue laser is used. An NA of the optical system is 0.85.

A track where phase change marks are recorded has a track pitch of 0.32 µm and a linear density of 0.12 µm.

As a user data capacity, about 23 Gbytes is realized.

Data is recorded by a groove recording method. That is, a track is preformed by a groove on the disk, and recording is performed in the groove.

Figure 1A:
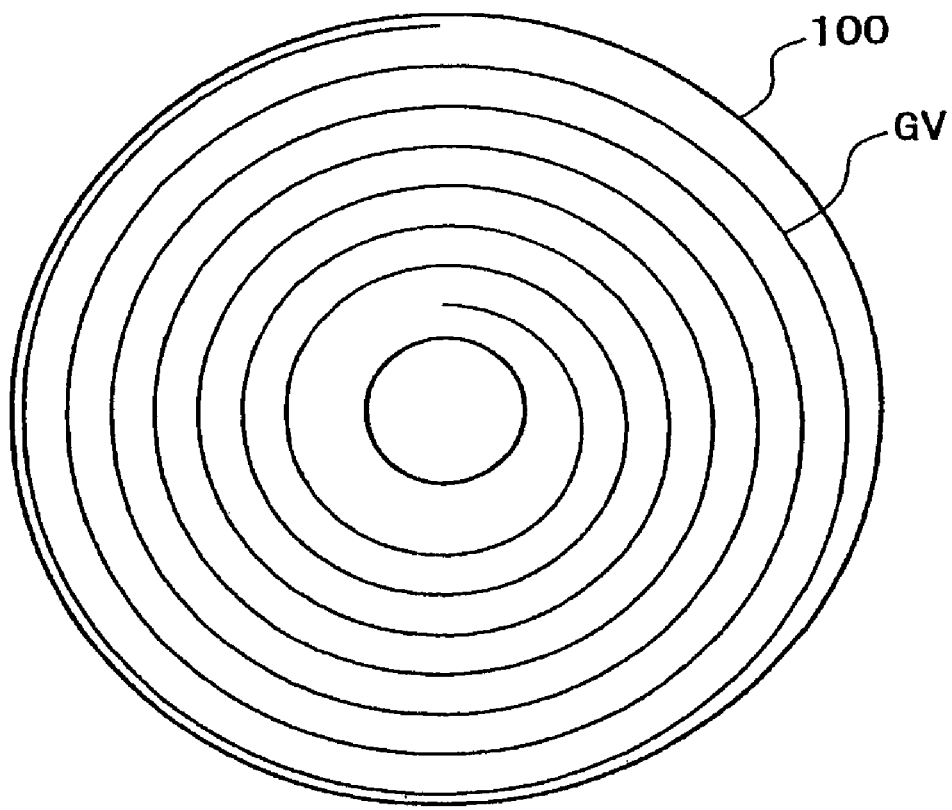
FIG. 1A is a diagram of assistance in explaining a groove of a disk according to an embodiment of the present invention.

As schematically shown in FIG. 1A, a groove GV is formed in a spiral fashion from an innermost circumference to an outermost circumference on the disk. Incidentally, as another example, the groove GV can be formed concentrically.

While the disk is driven to be rotated by a CLV (constant linear velocity) method for recording and reproduction of data, CLV is also applied to the groove GV. Hence, the number of wobbling waves of a groove for one round of the track is increased toward the outer circumference of the disk.

Figure 1B:
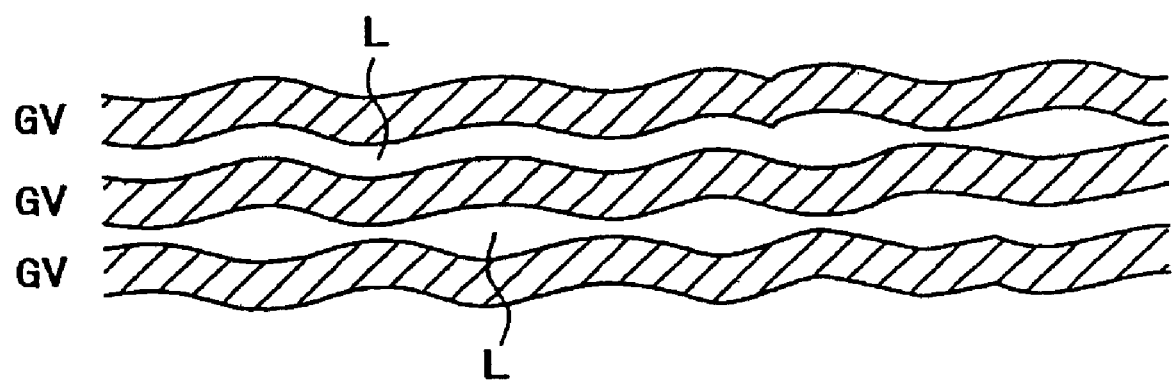
FIG. 1B is a diagram of assistance in explaining wobbling of the groove.

A physical address is represented by forming such a groove GV in a wobbling manner as shown in FIG. 1B.

That is, a right and a left side wall of the groove GV wobble in correspondence with a signal generated on the basis of an address or the like.

A land L is formed between the groove GV and an adjacent groove GV. As described above, data is recorded in the groove GV. That is, the groove GV forms a data track. Incidentally, the land L may be used as a data track to record data on the land L, or both the groove GV and the land L may be used as a data track.

FIG. 2 shows a layout (area arrangement) of a disk as a whole.

As areas on the disk, a read-in zone, a data zone, and a read-out zone are arranged from an inner circumference side.

In terms of area arrangement regarding recoding and reproduction, an inner circumference side of the read-in zone is a PB zone (reproduction-only area) and an area from an outer circumference side of the read-in zone to the read-out zone is an RW zone (recording and reproduction area).

The read-in zone is situated within a radius of 24 mm. A prerecorded data zone is situated from a radius of 22.3 mm to a radius of 23.1 mm.

In the prerecorded data zone, information used for copy protection and the like (prerecorded information) are recorded in advance by wobbling a groove formed on the disk in a spiral fashion. This information is not rewritable and is for reproduction only. That is, the prerecorded data zone forms the above-mentioned PB zone (reproduction-only area).

As the prerecorded information in the prerecorded data zone, copy protection information is recorded, for example. The copy protection information is used as follows, for example.

An optical disk system according to the present embodiment has a media key or a drive key indicating that a registered drive apparatus maker or disk maker can do business and that the maker is registered.

In a case of hacking, the drive key or the media key is recorded as copy protection information. This information can prevent media or a drive having the media key or the drive key from recording and reproduction.

In the read-in zone, a test write area and a defect management area are provided from a radius of 23.1 mm to a radius of 24 mm.

The test write area is used for test write and the like in setting conditions for recording and reproducing phase change marks, such as laser power at the time of recording/reproduction.

In the defect management area, information managing defect information on the disk is recorded and reproduced.

The data zone is formed from a radius of 24.0 mm to a radius of 58.0 mm. The data zone is an area where user data is actually recorded and reproduced by phase change marks.

The read-out zone is formed from a radius of 58.0 mm to a radius of 58.5 mm. A defect management area similar to that of the read-in zone is provided in the read-out zone, and the read-out zone is used as a buffer area to allow overrunning at the time of a seek.

An area from the radius of 23.1 mm, that is, the test write area to the read-out zone is the RW zone (recording and reproduction area) where phase change marks are recorded and reproduced.

FIG. 3A shows wobbling of a groove in a track of the RW zone, and FIG. 3B shows wobbling of a groove in a track of the PB zone.

In the RW zone, address information (ADIP) is formed in advance by wobbling the groove formed in a spiral fashion for tracking on the disk.

Information is recorded and reproduced by phase change marks in the groove where the address information is formed.

As shown in FIG. 3A, the groove in the RW zone, that is, the groove track where the ADIP address information is formed has a track pitch TP=0.32 μm.

Recording marks formed by phase change marks are recorded on the track. The phase change marks are recorded at a linear density of 0.12 μm/bit or 0.08 μm/ch bit by an RLL (1, 7) PP modulation method (RLL; Run Length Limited, PP: Parity preserve/Prohibit rmtr (repeated minimum transition runlength)) or the like.

Letting 1 T be 1 ch bit, length of a mark is 2 T to 8 T, and a minimum mark length is 2 T.

The address information has a wobbling cycle of 69 T, and a wobbling amplitude WA of about 20 nm (p-p).

Frequency bands of the address information and the phase change marks are set so as not to coincide with each other, whereby each does not affect detection of the other.

A CNR (carrier noise ratio) of wobbling of the address information is 30 dB after recording at a bandwidth of 30 KHz, and an address error rate thereof is $1 \times 10^{-3}$ or less, including effects of perturbations (disk skew, defocus, disturbances and the like).

On the other hand, the track formed by the groove in the PB zone in FIG. 3B has a wider track pitch and a greater wobbling amplitude than the track formed by the groove in the RW zone in FIG. 3A.

Specifically, the track formed by the groove in the PB zone in FIG. 3B has a track pitch TP=0.35 μm, a wobbling cycle of 36 T, and a wobbling amplitude WA of about 40 nm (p-p). The wobbling cycle of 36 T indicates that recording linear density of the prerecorded information is higher than recording linear density of the ADIP information. Further, since the minimum length of a phase change mark is 2 T, the recording linear density of the prerecorded information is lower than recording linear density of the phase change mark.

No phase change marks are recorded on the track of the PB zone.

A sinusoidal wobbling waveform is formed in the RW zone, whereas a sinusoidal waveform or a rectangular waveform can be recorded in the PB zone.

It is known that phase change marks can be used for recording and reproduction of data because at a signal quality of a CNR of about 50 dB at a bandwidth of 30 KHz, a symbol error rate of $1 \times 10^{-16}$ or less can be achieved after error correction by attaching ECC (error correction code) to the data for recording and reproduction.

A CNR of wobbles of the ADIP address information is 35 dB at a bandwidth of 30 KHz when phase change marks are not recorded yet.

This level of signal quality suffices for the address information by performing interpolation protection on the basis of so-called continuity determination and the like. However, a signal quality of a CNR of 50 dB equal to that of the phase change marks or more is desired to be obtained for the prerecorded information recorded in the PB zone. Thus, the groove physically different from the groove in the RW zone is formed in the PB zone, as shown in FIG. 3B.

First, the track pitch is widened to thereby prevent a crosstalk from an adjacent track and the wobble amplitude is doubled, whereby the CNR can be improved by +6 dB.

Then, the CNR can be improved by +2 dB by using a rectangular wobble waveform.

In total, the CNR is 43 dB.

A difference in recording band between the phase change marks and the wobbles in the prerecorded data zone is represented by the wobbles of 18 T (18 T is half of 36 T) and the phase change marks of 2 T. At this point, 9.5 dB is obtained.

Thus the CNR of the prerecorded information is equal to 52.5 dB. Even when −2 dB is estimated as a result of a crosstalk from an adjacent track, the CNR is equal to 50.5 dB. That is, substantially the same level of signal quality as that of the phase change marks is achieved, and it is therefore appropriate enough to use a wobbling signal to record and reproduce the prerecorded information.

1-2. Prerecorded Information

FIGS. 4(a) to 4(k) illustrate a method of modulation of the prerecorded information for forming the wobbling groove in the prerecorded data zone.

The modulation uses FM code.

FIG. 4(a) shows data bits, FIG. 4(b) shows channel clocks, FIG. 4(c) shows FM codes, and FIG. 4(d) shows wobble waveforms, the data bits, the channel clocks, the FM codes, and the wobble waveforms being arranged vertically.

One bit of data is 2 ch (2 channel clocks). When bit information is "1," the FM code has 1.2 of frequency of the channel clocks.

When bit information is "0," the FM code is represented by ½ the frequency of the bit information "1."

As a wobble waveform, a rectangular wave of the FM code may be directly recorded, while a sinusoidal waveform may be recorded as shown in FIG. 4(d).

Incidentally, the FM code and the wobble waveform may have patterns as shown in FIGS. 4(e) and 4(f) as patterns of opposite polarity from those of FIGS. 4(c) and 4(d).

Under such rules of FM code modulation, an FM code waveform and a wobble waveform (sinusoidal waveform) when a data bit stream is "10110010" as shown in FIG. 4(g) are as shown in FIGS. 4(h) and 4(i).

Incidentally, an FM code waveform and a wobble waveform corresponding to the patterns as shown in FIGS. 4(e) and 4(f) are as shown in FIGS. 4(j) and 4(k).

Referring to FIGS. 5A to 5D, FIGS. 6A to 6D, and FIGS. 7A and 7B, ECC formats of phase change marks and prerecorded information will be described.

Figure 5A:
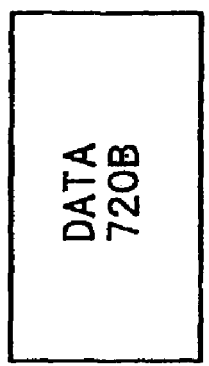
FIGS. 5A to 5D are diagrams of assistance in explaining an ECC structure of phase change marks according to the embodiment.
Figure 5B:
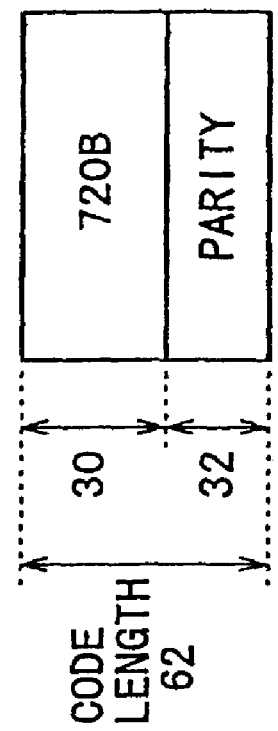
Figure 5C:
Figure 5D:
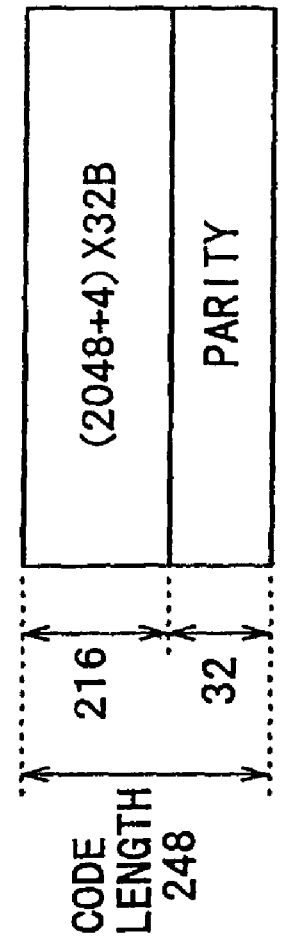

First, FIGS. 5A, to 5D show the ECC format of main data (user data) recorded and reproduced by phase change marks.

As ECC (error correction code), there are two codes, that is, LDC (long distance code) for main data of 64 KB (=2048 bytes per sector×32 sectors) and BIS (burst indicator subcode).

The main data of 64 KB shown in FIG. 5A is ECC-encoded as shown in FIG. 5B. That is, an EDC (error detection code) of 4 B is added to one sector of 2048 B of the main data, and LDC is encoded for the 32 sectors. The LDC is an RS (reed solomon) (248, 216, 32) code with a code length of 248, data of 216, and a distance of 32. There are 304 code words.

On the other hand, BIS is ECC-encoded as shown in FIG. 5D for data of 720 B shown in FIG. 5C. Specifically, the BIS is an RS (reed solomon) (62, 30, 32) code with a code length of 62, data of 30, and a distance of 32. There are 24 code words.

Figure 7A:
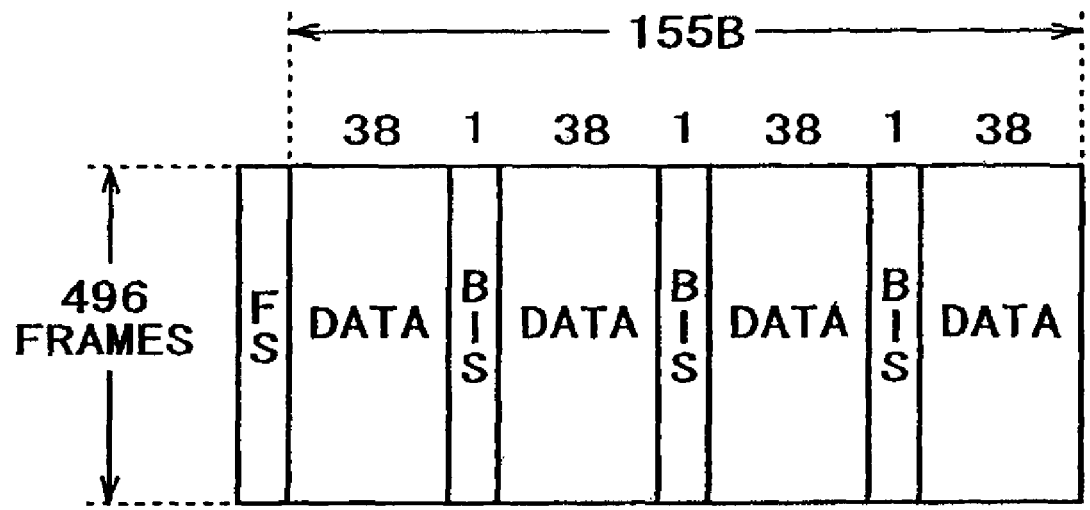
FIG. 7A is a diagram of assistance in explaining a frame structure of main data in the RW zone according to the embodiment.

FIG. 7A shows a frame structure of the main data in the RW zone.

The LDC data and the BIS form the frame structure shown in the figure. Specifically, data (38 B), BIS (1 B), data (38 B), BIS (1 B), and data (38 B) are arranged per frame to form a structure of 155 B. That is, one frame is formed by data of 38 B×4, or 152 B, and BIS of 1 B inserted after each 38 B.

A frame sync FS (frame synchronizing signal) is disposed at the front of one frame of 155 B. One block has 496 frames.

The LDC data has a $0^{th}$, a $2^{nd}$, ... even-numbered code word placed in a $0^{th}$, a $2^{nd}$, ... even-numbered frame and a $1^{st}$, a $3^{rd}$, ... odd-numbered code word placed in a $1^{st}$ a $3^{rd}$, ... odd-numbered frame.

BIS uses a code much superior to a code of LDC in correction capability. Almost all is corrected. That is, a code with a distance of 32 for a code length of 62 is used.

Thus, BIS symbols when errors are detected can be used as follows.

In ECC decoding, BIS is decoded first. When two adjacent to each other of BISs and a frame sync FS in the frame structure of FIG. 7A have an error, data of 38 B sandwiched between the two is considered to be a burst error. An error pointer is added to the data of 38 B. With LDC, this error pointer is used to make pointer erasure correction.

Thereby correction capability can be enhanced as compared with correction with only LDC. BIS includes address information and the like. The address is used for example when there is no address information in the form of a wobbling groove on a ROM type disk or the like.

Next, FIGS. 6A, to 6D show the ECC format of prerecorded information.

In this case, as ECC, there are two codes, that is, LDC (long distance code) for main data of 4 KB (=2048 B per sector×2 sectors) and BIS (burst indicator subcode).

The data of 4 KB as prerecorded information shown in FIG. 6A is ECC-encoded as shown in FIG. 6B. That is, an EDC (error detection code) of 4 B is added to one sector of 2048 B of the main data, and LDC is encoded for the 2 sectors. The LDC is an RS (reed solomon) (248, 216, 32) code with a code length of 248, data of 216, and a distance of 32. There are 19 code words.

On the other hand, BIS is ECC-encoded as shown in FIG. 6D for data of 120 B shown in FIG. 6C. Specifically, the BIS is an RS (reed solomon) (62, 30, 32) code with a code length of 62, data of 30, and a distance of 32. There are four code words.

Figure 7B:
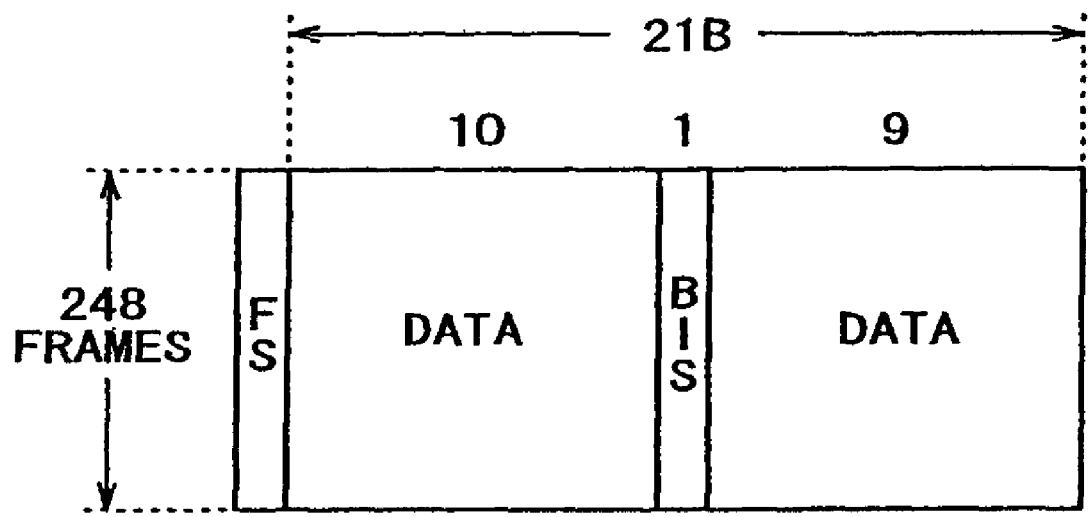
FIG. 7B is a diagram of assistance in explaining a frame structure of the prerecorded information in the PB zone.

FIG. 7B shows a frame structure of the prerecorded information in the PB zone.

The LDC data and the BIS form the frame structure shown in the figure. Specifically, a frame sync FS (1 B), data (10 B), BIS (1 B), and data (9 B) are arranged per frame to form a structure of 21 B. That is, one frame is formed by data of 19 B and inserted BIS of 1 B.

A frame sync FS (frame synchronizing signal) is disposed at the front of one frame. One block has 248 frames.

Also in this case, BIS uses a code much superior to a code of LDC in correction capability, and almost all is corrected. Thus, BIS symbols when errors are detected can be used as follows.

In ECC decoding, BIS is decoded first. When two adjacent to each other of BISs and a frame sync FS have an error, data of 10 B or 9 B sandwiched between the two is considered to be a burst error. An error pointer is added to the data of 10 B or 9 B. With LDC, this error pointer is used to make pointer erasure correction.

Thereby correction capability can be enhanced as compared with correction with only LDC.

BIS includes address information and the like. In the prerecorded data zone, prerecorded information is recorded by a wobbling groove and hence there is no address information formed by a wobbling groove. Thus an address in the BIS is used for access.

As is understood from FIGS. 5A to 5D and FIGS. 6A, to 6D, the same code and structure are used as the ECC format for the data represented by phase change marks and the prerecorded information.

This means that processing for ECC decoding of the prerecorded information can be performed by a circuit system for performing ECC decoding processing at the time of reproduction of the data represented by phase change marks, and that efficiency of configuration of hardware as the disk drive apparatus can be increased.

FIG. 8 shows frame syncs in the prerecorded data zone.

As frame sync FS, there are seven kinds of frame syncs FS0 to FS6. Each of the frame syncs FS0 to FS6 is formed by a total of 16 channel bits, that is, 8 channel bits of a sync body "11001001" using a pattern out of the rules of FM code modulation and 8 channel bits of a sync ID for each of the seven kinds of frame syncs FS0 to FS6.

When represented by data bits, the sync ID of a frame sync FS0, for example, is represented by 3 bits "000" and 1 parity bit (0 in this case). This sync ID is subjected to FM code modulation to provide "10101010."

Similarly, the other sync IDs are represented by 3 data bits and 1 parity bit, and are subjected to FM code modulation.

At the time of recording, frame syncs FS are subjected to NRZI conversion and then recorded.

FIG. 9 shows a mapping of frame syncs.

The 248 frames of one ECC block of the prerecorded information shown in FIG. 7B are divided into eight address frames of 31 frames each.

Each of the address frames has a frame number 0 to 30. For the frame number "0," FS0 is used as a special frame sync not used as other frame syncs. The frame sync FS0 makes it possible to find the head of the address frames and perform address synchronization.

For the frame numbers "1" to "30," frame syncs (FS1 to FS6) are disposed in order as shown in FIG. 9. This order of arrangement of the frame syncs allows the head of the address frames to be identified even when the frame sync FS0 at the head cannot be identified.

As described above, an address included in the BIS is used for access in the prerecorded data zone.

FIG. 10A and FIG. 10B show information included in the BIS of an ECC block in the prerecorded data zone.

The BIS information comprises addresses and user control data.

FIG. 10A shows address fields in the BIS. As addresses, there are eight address fields (#0 to #7) in one ECC block.

One address field is formed by 9 bytes. The address field #0, for example, is formed by 9 bytes A0-0 to A0-8.

An address value indicating an ECC block address referred to as an AUN (address unit number) is disposed in 4 MSB bytes of each of the address fields.

An address field number is disposed in 3 low-order bits (3 Lsbits) of a 5th byte of each of the address fields.

Further, parity for each of the address fields is disposed in 4 low-order bytes of the address field.

On the other hand, as shown in FIG. 10B, there are two units (#0 and #1) of user control data in a BIS within one ECC block.

One unit of user control data is formed by 24 bytes. The unit #0, for example, is formed by 24 bytes UC0-0 to UC0-23.

The user control data is reserved for use by a future system.

Figure 11:
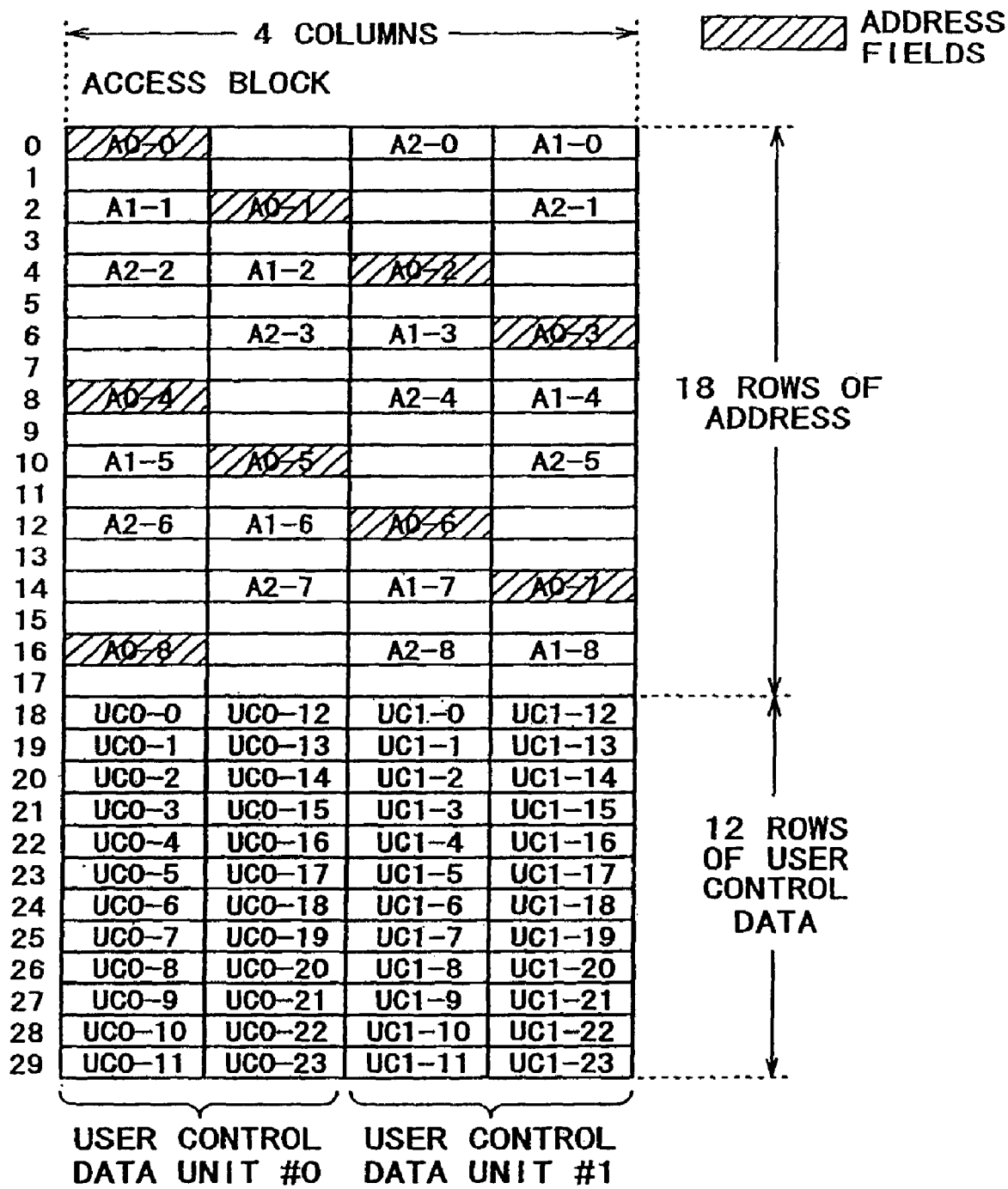
FIG. 11 is a diagram of assistance in explaining a BIS structure of the prerecorded information according to the embodiment.

FIG. 11 shows an arrangement of BIS information of the BIS, that is, the BIS cluster of the ECC block in the prerecorded data zone.

The BIS cluster comprises four correction codes. In FIG. 11, only information excluding parity is shown. The codes are formed in a column direction of the figure. The BIS cluster is formed by four columns.

One column of information is formed by a total of 30 rows, that is, 18 rows of addresses and 12 rows of user control data.

The addresses of the address fields #0 to #7 are arranged in an interleaved manner in the four columns, as shown in FIG. 11. Although only the address fields #0, #1, and #2 are shown in FIG. 11, the 9 bytes A0-0 to A0-8 comprising the address field #0, for example, are arranged in positions shown as hatched portions in the figure.

The units #0 and #1 of user control data are each arranged in an area of 12 rows as shown in FIG. 11.

At the time of recording, the address field #0 shown in FIG. 11, for example, is recorded in an oblique direction of the BIS cluster so as to be arranged sequentially.

Figure 12:
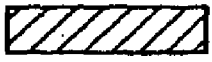
FIG. 12 is a diagram of assistance in explaining a BIS structure of the prerecorded information according to the embodiment.

FIG. 12 shows the whole BIS cluster including parity.

As described above, the error correction code of the BIS is an RS (62, 30, 32) code. The BIS cluster has four codes with a code length of 62 symbols, and one code is encoded in a vertical direction as shown by an arrow in FIG. 12.

FIG. 13 illustrates an order in which the 248 symbols of the BIS cluster including the parity are recorded.

Figure 14:
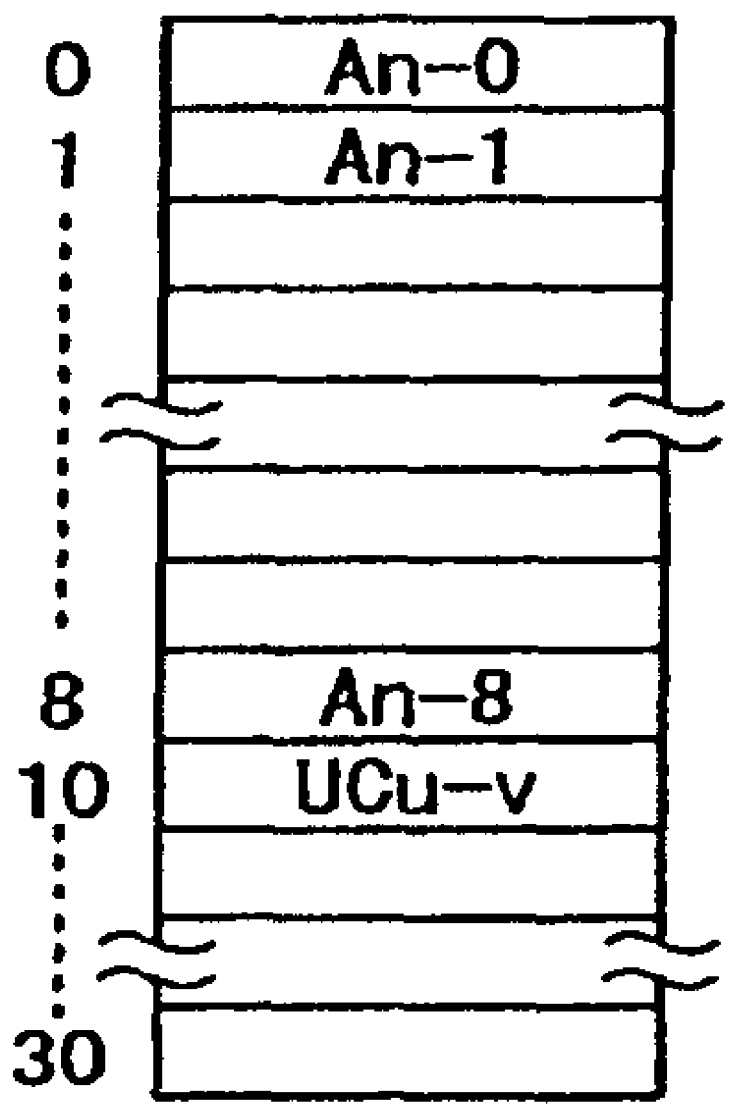
FIG. 14 is a diagram of assistance in explaining an address unit of the prerecorded information according to the embodiment.

At the time of recording, the BIS cluster is recorded as eight address units. One address unit is formed by 31 symbols, as shown in FIG. 14.

In first 9 bytes in each of the address units, 9 bytes (An-0 to An-8) as an address field #n corresponding to each address unit number are disposed. For example, the address field #0 (A0-0 to A0-8) is disposed in an address unit 0.

The 31 symbols as such an address unit 0 are arranged as shown as hatched portions in FIG. 13, for example.

The 31 symbols of one address unit corresponds to the above-mentioned 31 address frames. The frame numbers and the frame sync patterns (FS0 to FS6) in FIG. 9 make it possible to detect timing of one address unit from timing of the frame sync FS0 and thereby reproduce the addresses of the address fields (#0 to #7).

1-3. ADIP Address

Next, ADIP addresses recorded as a wobbling groove in the RW zone will be described.

Figures 15A, 15B, 15C:
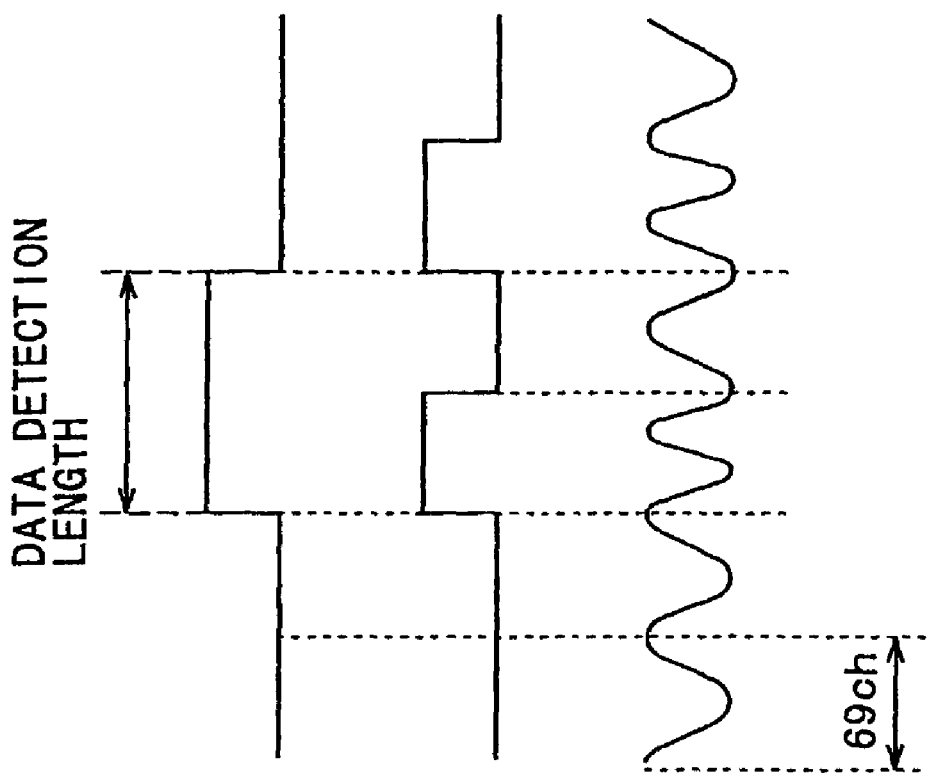
FIGS. 15A, 15B, and 15C are diagrams of assistance in explaining a method of modulation of ADIP information according to the embodiment.

FIGS. 15A, 15B, and 15C illustrate MSK (minimum shift keying) modulation, one of FSK modulations, used as a method of modulation of ADIP addresses recorded by wobbling a groove.

Detection length (window length) of data is a unit of two wobble sections. One wobble section is a section of one cycle of a wobble at a carrier frequency.

Data such as addresses is subjected to differential encoding using one wobble as a unit before recording, as shown in FIGS. 15A and 15B.

Specifically, precoded data after differential encoding before recording is "1" during one wobble period from a rising edge of data "1" to a falling edge.

As shown in FIG. 15C, an MSK stream obtained by MSK modulation of such precoded data is cos ωt or −cos ωt, which represents a carrier, when the precoded data is "0." When the precoded data is "1," the MSK stream is cos 1.5 ωt or −cos 1.5 ωt, which represents 1.5 times the frequency of the carrier.

As shown in FIG. 15C, letting 1 ch be length of 1 channel bit of phase change data recorded and reproduced, a cycle of the carrier is 69 ch.

In the case of the present embodiment, three ADIP addresses are included in one RUB (recording unit block: a recording and reproducing cluster) as a data recording unit.

FIG. 16 shows such a RUB. The RUB (recording and reproducing cluster) is a recording and reproducing unit as 498 frames obtained by adding a link area of 2 frames for a PLL or the like to a front and a rear of the 496 frames of the ECC block of the data shown in FIG. 7A.

Figures 16A, 16B:
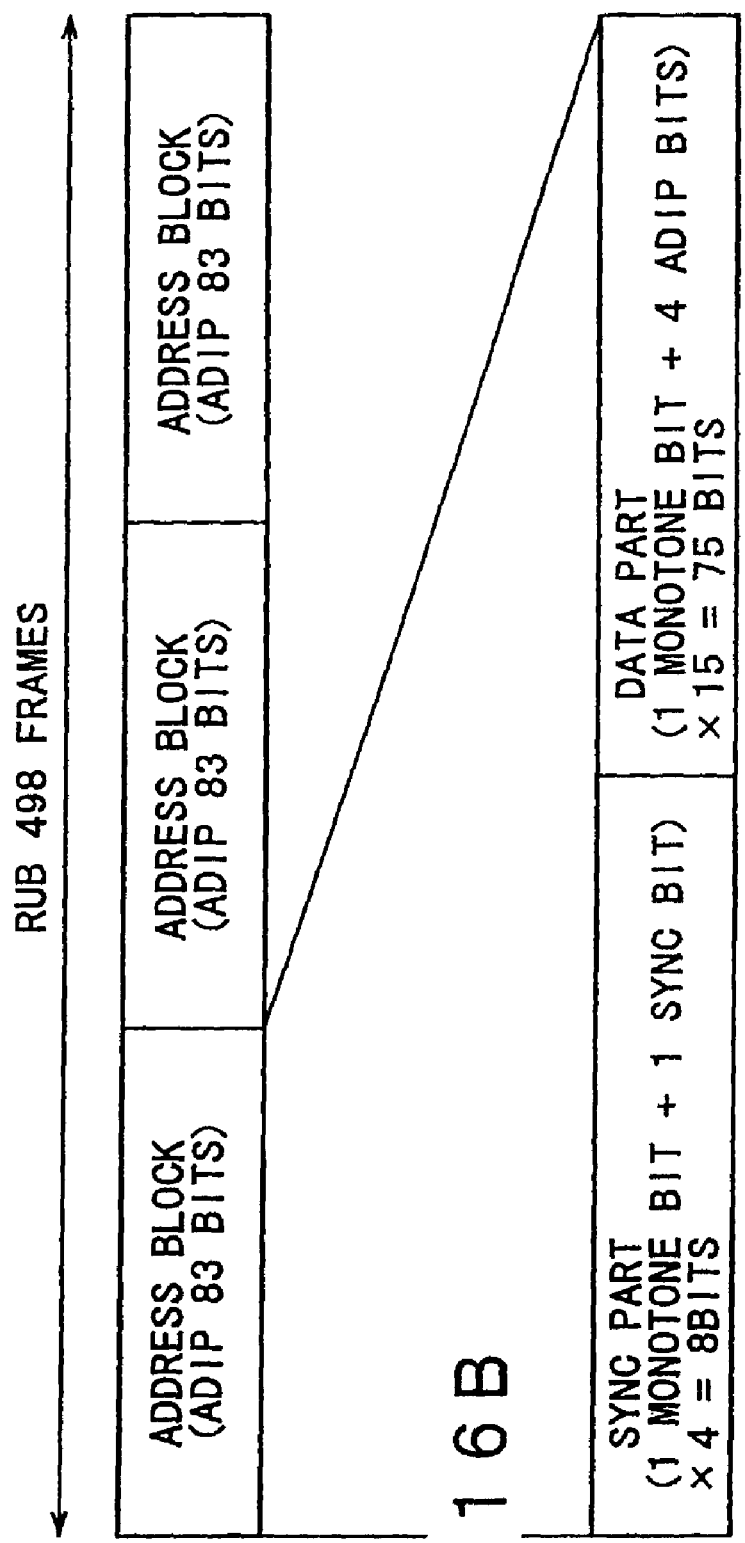
FIGS. 16A and 16B are diagrams of assistance in explaining address blocks in a RUB according to the embodiment.

As shown in FIG. 16A, a section corresponding to one RUB includes three address blocks as ADIP.

One address block is formed by 83 bits.

FIG. 16B shows a composition of one address block. The address block of 83 bits comprises a sync part (synchronizing signal part) of 8 bits and a data part of 75 bits.

In the 8 bits of the sync part, four units of a sync block comprising a monotone bit (1 bit) and a sync bit (1 bit) are formed.

In the 75 bits of the data part, 15 units of an ADIP block comprising a monotone bit (1 bit) and ADIP bits (4 bits) are formed.

The monotone bits, the sync bit, and the ADIP bits are each formed by a wobble having 56 wobble periods. An MSK mark for bit sync is disposed at the head of these bits.

Following the MSK mark of a monotone bit, wobbles of the carrier frequency are formed continuously. The sync bit and the ADIP bits, which will be described later, are formed with wobbles formed by MSK modulated waveforms following the MSK mark.

A composition of the sync part will first be described with reference to FIGS. 17A and 17B.

As is understood from FIGS. 17A and 17B, the sync part of 8 bits is formed by four sync blocks (sync blocks "0," "1," "2," and "3"). Each of the sync blocks is 2 bits.

The sync block "0" is formed by a monotone bit and a sync "0" bit.

The sync block "1" is formed by a monotone bit and a sync "1" bit.

The sync block "2" is formed by a monotone bit and a sync "2" bit.

The sync block "3" is formed by a monotone bit and a sync "3" bit.

The monotone bit in each of the sync blocks is a waveform of continuous wobbles of a single frequency representing the carrier, as described above. The monotone bit is shown in FIG. 18A. Specifically, an MSK mark as a bit sync bs is attached to a start of the 56 wobble periods, followed by the continuous wobbles of the single frequency.

Incidentally, an MSK mark pattern is shown under wobble amplitude in each of FIGS. 18A to 18E.

There are four kinds of sync bits ranging from the sync "0" bit to the sync "3" bit as described above.

The four kinds of sync bits are wobble patterns as shown in FIGS. 18B, 18C, 18D, and 18E, respectively.

The sync "0" bit of FIG. 18B is a pattern where an MSK mark as a bit sync bs is followed by 16 wobble sections and then an MSK mark, and further by 10 wobble sections and then an MSK mark.

Each of the sync "1" bit to the sync "3" bit is a pattern formed by shifting the position of the MSK marks backward by two wobble sections.

Specifically, the sync "1" bit of FIG. 18C is a pattern where an MSK mark as a bit sync bs is followed by 18 wobble sections and then an MSK mark, and further by 10 wobble sections and then an MSK mark.

The sync "2" bit of FIG. 18D is a pattern where an MSK mark as a bit sync bs is followed by 20 wobble sections and then an MSK mark, and further by 10 wobble sections and then an MSK mark.

The sync "3" bit of FIG. 18E is a pattern where an MSK mark as a bit sync bs is followed by 22 wobble sections and then an MSK mark, and further by 10 wobble sections and then an MSK mark.

Each of the sync patterns is unique as distinct from the monotone bit and the ADIP bits to be described next. Thus the sync bits of the four patterns are disposed one in each of the sync blocks. The disk drive apparatus can achieve synchronization when the disk drive apparatus can detect one of the sync units of the four patterns from the sync part section.

A composition of the data part in the address block will next be described with reference to FIGS. 19A and 19B.

Figures 19A, 19B:
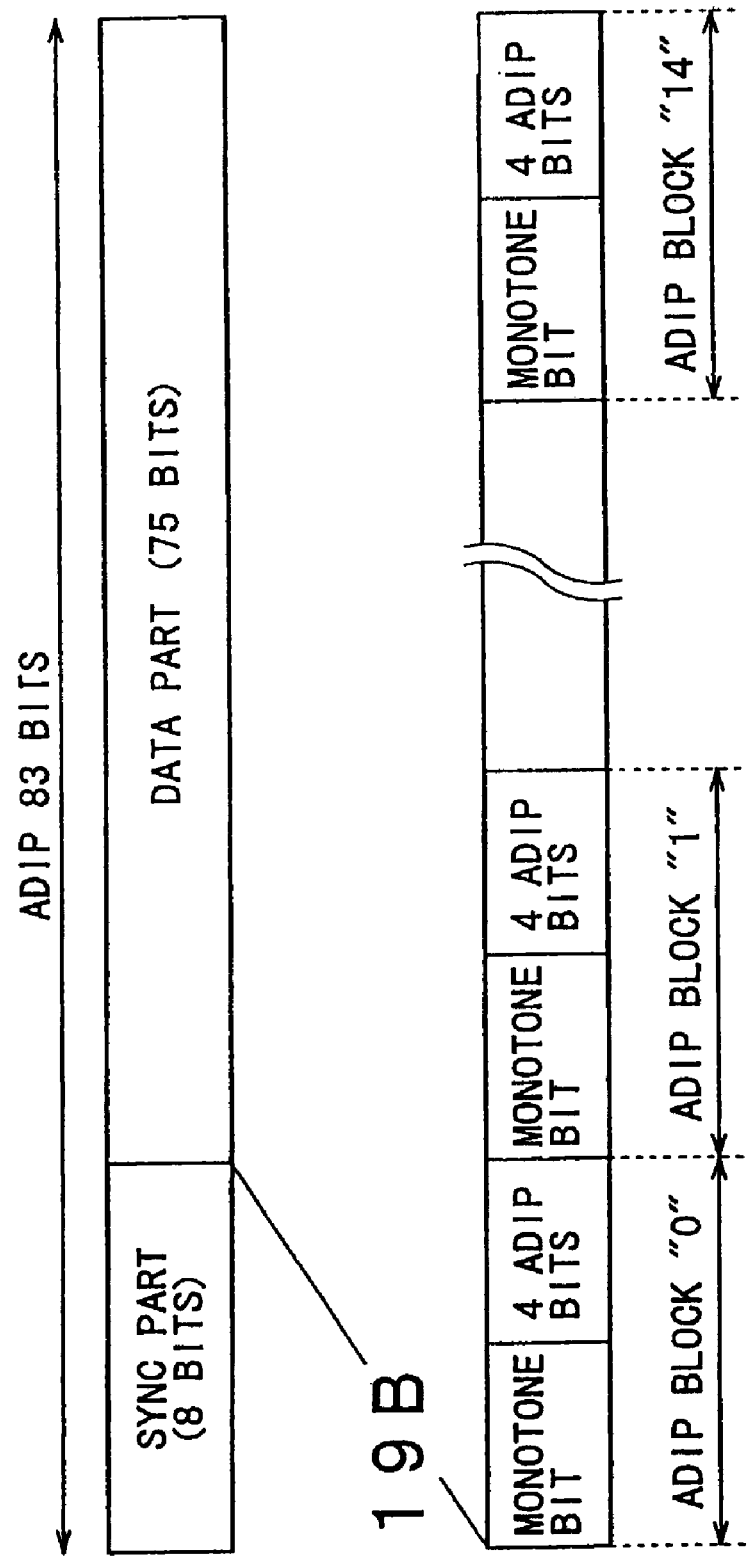
FIGS. 19A and 19B are diagrams of assistance in explaining a data part of the disk according to the embodiment.

As is understood from FIGS. 19A and 19B, the data part comprises 15 ADIP blocks (ADIP blocks "0" to "14"). Each of the ADIP blocks is 5 bits.

Each of the 5-bit ADIP blocks comprises 1 monotone bit and 4 ADIP bits.

In each of the ADIP blocks, as in the case of the sync blocks, an MSK mark as a bit sync bs is attached to a start of 56 wobble periods of the monotone bit, followed by continuous wobbles of the carrier frequency. The monotone bit is shown in FIG. 20A.

Since one ADIP block includes 4 ADIP bits, 60 ADIP bits of the 15 ADIP blocks form address information.

Patterns of "1" and "0" as ADIP bits are shown in FIGS. 20B and 20C.

As shown in FIG. 20B, in the wobble waveform pattern when a value of an ADIP bit is "1," an MSK mark as a bit sync bs disposed at the front is followed by an MSK mark after 12 wobble sections.

As shown in FIG. 20C, in the wobble waveform pattern when a value of an ADIP bit is "0," an MSK mark as a bit sync bs disposed at the front is followed by an MSK mark after 14 wobble sections.

Thus, MSK modulation data is recorded in the wobbling groove. An address format of the ADIP information thus recorded is as shown in FIG. 21.

FIG. 21 illustrates a method of error correction for ADIP address information.

The ADIP address information has 36 bits, to which 24 parity bits are added.

The ADIP address information of 36 bits has 3 layer number bits (a layer no. bit 0 to a layer no. bit 2) for multilayer recording, 19 bits (an RUB no. bit 0 to a layer no. bit 18) for an RUB (recording unit block), and 2 bits (an address no. bit 0 and an address no. bit 1) for the three address blocks of one RUB.

Further, 12 bits are provided as AUX data such as a disc ID for recording conditions such as recording and reproducing laser power and the like.

The ECC unit of the address data is thus a unit of a total of 60 bits, and comprises 15 nibbles (1 nibble=4 bits) Nibble 0 to Nibble 14, as shown in FIG. 21.

The parity bits are stored as inverted bits.

The error correction method is a nibble-based Reed-Solomon code RS (15, 9, 7) with 4 bits as one symbol. That is, code length is 15 nibbles, data is 9 nibbles, and parity is 6 nibbles.

2. Disk Drive Apparatus

A disk drive apparatus capable of performing recording/reproduction of the disk as described above will next be described.

Figure 22:
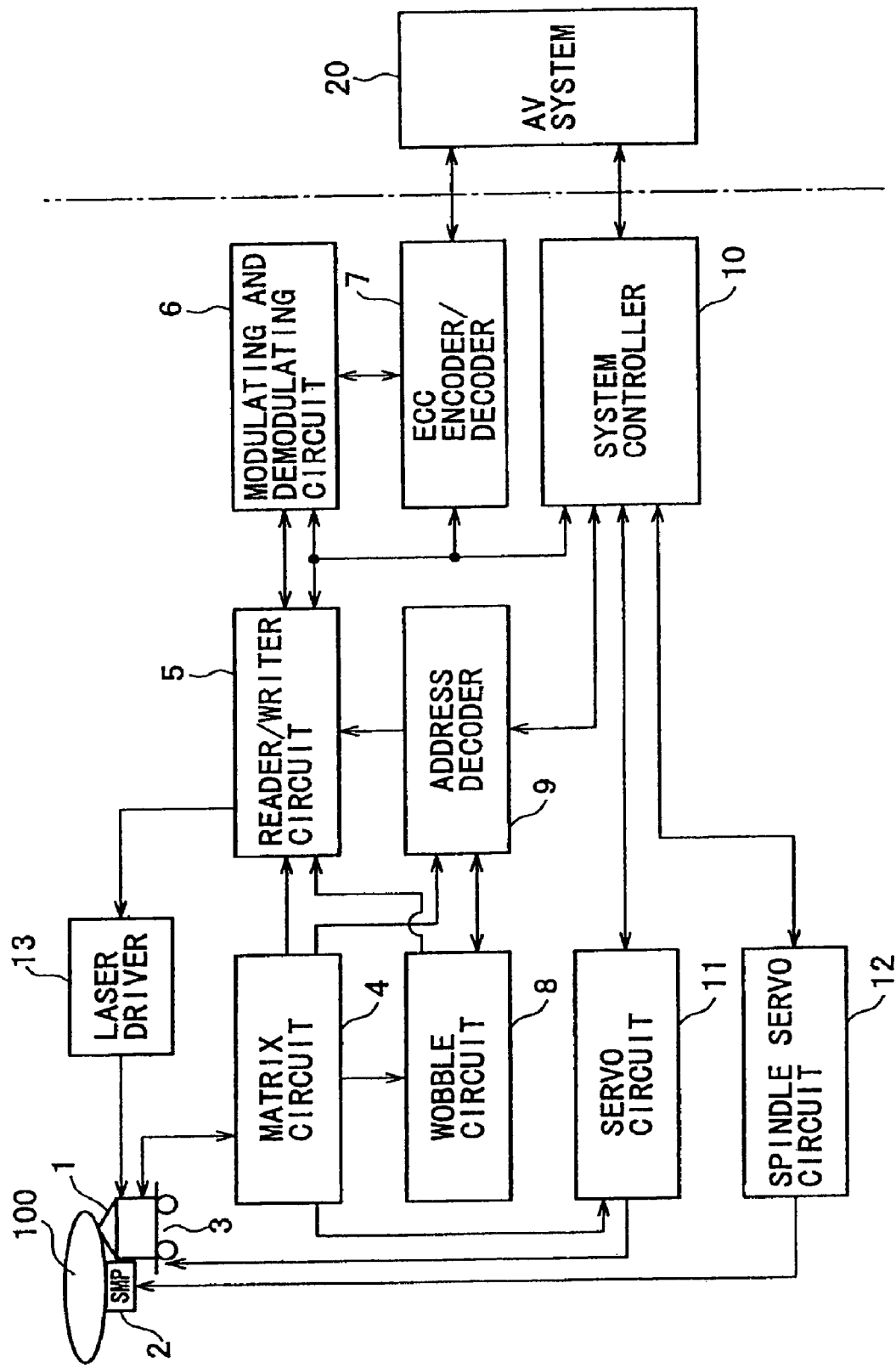
FIG. 22 is a block diagram of a disk drive apparatus according to the embodiment.

FIG. 22 shows a configuration of the disk drive apparatus.

A disk 100 in FIG. 22 is the above-described disk according to the present embodiment.

The disk 100 is loaded onto a turntable not shown in the figure, and is driven by a spindle motor (SPM) 2 to be rotated at a constant linear velocity (CLV) at the time of recording/reproducing operation.

Then an optical pickup 1 reads ADIP information embedded as wobbling of a groove track in an RW zone on the disk 100. The optical pickup 1 also reads prerecorded information embedded as wobbling of the groove track in a PB zone.

At the time of recording, the optical pickup records user data as phase change marks on the track in the RW zone. At the time of reproduction, the optical pickup reads the phase change marks recorded by the optical pickup.

Formed within the optical pickup 1 are: a laser diode serving as a laser light source; a photodetector for detecting reflected light; an objective lens at an output end of laser light; and an optical system (not shown) for irradiating a recording surface of the disk with the laser light via the objective lens and guiding the reflected light to the photodetector.

The laser diode outputs a so-called blue laser with a wavelength of 405 nm. An NA of the optical system is 0.85.

The objective lens within the optical pickup 1 is held by a two-axis mechanism so as to be movable in a tracking direction and a focus direction.

The optical pickup 1 as a whole is movable in a direction of the radius of the disk by a sled mechanism 3.

The laser diode in the optical pickup 1 is driven by a drive signal (drive current) from a laser driver 13 to emit laser light.

The photodetector detects information as the light reflected from the disk 100, converts the information into an electric signal corresponding to an amount of light received, and then supplies the electric signal to a matrix circuit 4.

The matrix circuit 4 has a current-voltage conversion circuit, a matrix calculation/amplification circuit and the like for output currents from a plurality of light receiving elements as the photodetector. The matrix circuit 4 generates necessary signals by matrix calculation processing.

For example, the matrix circuit 4 generates a high-frequency signal (reproduced data signal) corresponding to reproduced data, a focus error signal and a tracking error signal for servo control, and the like.

Further, the matrix circuit 4 generates a push-pull signal as a signal related to the wobbling of the groove, that is, a signal for detecting wobbling.

The reproduced data signal outputted from the matrix circuit 4 is supplied to a reader/writer circuit 5; the focus error signal and the tracking error signal are supplied to a servo circuit 11; and the push-pull signal is supplied to a wobble circuit 8.

The reader/writer circuit 5 subjects the reproduced data signal to binarization processing, reproduced clock generation processing by a PLL and the like, thereby reproduces data read as phase change marks, and then supplies the data to a modulating and demodulating circuit 6.

The modulating and demodulating circuit 6 has a functional part as a decoder at the time of reproduction and a functional part as an encoder at the time of recording.

At the time of reproduction, as decode processing, the modulating and demodulating circuit 6 demodulates a run length limited code on the basis of a reproduced clock.

An ECC encoder/decoder 7 performs ECC encode processing that adds error correction codes at the time of recording and ECC decode processing for error correction at the time of reproduction.

At the time of reproduction, the ECC encoder/decoder 7 captures the data demodulated by the modulating and demodulating circuit 6 into an internal memory, then performs error detection/correction processing, deinterleaving processing and the like, and thereby obtains reproduced data.

The data decoded to the reproduced data by the ECC encoder/decoder 7 is read and transferred to an AV (Audio-Visual) system 20 on the basis of an instruction from a system controller 10.

The push-pull signal outputted from the matrix circuit 4 as the signal related to the wobbling of the groove is processed in the wobble circuit 8. The push-pull signal as ADIP information is subjected to MSK demodulation in the wobble circuit 8, thereby demodulated into a data stream constituting ADIP addresses, and then supplied to an address decoder 9.

The address decoder 9 decodes the data supplied thereto, thereby obtains an address value, and then supplies the address value to the system controller 10.

Also, the address decoder 9 generates a clock by PLL processing using a wobble signal supplied from the wobble circuit 8, and supplies the clock to various parts as an encode clock at the time of recording, for example.

A push-pull signal as the prerecorded information from the PB zone, as the push-pull signal outputted from the matrix circuit 4 as the signal related to the wobbling of the groove, is subjected to processing of a band-pass filter in the wobble circuit 8, and is then supplied to the reader/writer circuit 5. The push-pull signal is binarized as in the case of phase change marks, and thereby converted into a data bit stream. The data bit stream is ECC-decoded and deinterleaved by the ECC encoder/decoder 7, whereby data as the prerecorded information is extracted. The extracted prerecorded information is supplied to the system controller 10.

The system controller 10 can perform various setting processing, copy protect processing and the like on the basis of the read prerecorded information.

At the time of recording, recording data is transferred from the AV system 20. The recording data is supplied to the memory in the ECC encoder/decoder 7 to be buffered.

In this case, as processing for encoding the buffered recording data, the ECC encoder/decoder 7 performs addition of error correction codes, interleaving, and addition of subcodes and the like.

The ECC-encoded data is subjected to RLL (1-7) PP modulation in the modulating and demodulating circuit 6, and then supplied to the reader/writer circuit 5.

As described above, the clock generated from the wobble signal is used as the encode clock serving as a reference clock for the above encode processing at the time of recording.

The recording data generated by the encode processing is supplied to the laser driver 13 as a laser drive pulse after as recording compensation processing, the reader/writer circuit 5 adjusts a laser drive pulse waveform and finely adjusts optimum recording power, for example, to characteristics of a recording layer, spot shape of the laser light, recording linear velocity and the like.

The laser driver 13 provides the laser drive pulse supplied thereto to the laser diode within the pickup 1 and thereby drives the laser diode to emit laser light. Thereby pits (phase change marks) corresponding to the recording data are formed on the disk 100.

The laser driver 13 has a so-called APC (Auto Power Control) circuit to control laser output at a constant level without depending on the temperature and the like while monitoring laser output power through output of a laser power monitoring detector provided within the optical pickup 1. Target values of the laser output at the time of recording and at the time of reproduction are supplied from the system controller 10, and the laser output level is controlled to be at the target values at the time of recording and at the time of reproduction, respectively.

The servo circuit 11 generates various servo drive signals for focus, tracking, and the sled from the focus error signal and the tracking error signal supplied from the matrix circuit 4, and thereby performs servo operation.

Specifically, the servo circuit 11 generates a focus drive signal and a tracking drive signal in response to the focus error signal and the tracking error signal, to drive a focus coil and a tracking coil of the two-axis mechanism within the optical pickup 1. Thereby a tracking servo loop and a focus servo loop are formed by the pickup 1, the matrix circuit 4, the servo circuit 11, and the two-axis mechanism.

In response to a track jump instruction from the system controller 10, the servo circuit 11 turns off the tracking servo loop and outputs a jump drive signal to thereby perform track jump operation.

The servo circuit 11 further generates a sled drive signal on the basis of a sled error signal obtained as a low-frequency component of the tracking error signal, access control from the system controller 10 and the like, to drive the sled mechanism 3. Though not shown, the sled mechanism 3 has a mechanism formed by a main shaft for holding the optical pickup 1, a sled motor, a transmission gear and the like. By driving the sled motor according to the sled drive signal, a required slide movement of the pickup 1 is effected.

A spindle servo circuit 12 effects control for CLV rotation of a spindle motor 2.

The spindle servo circuit 12 obtains the clock generated by PLL processing on the wobble signal as information on current rotational speed of the spindle motor 2, and compares the information with predetermined CLV reference speed information to thereby generate a spindle error signal.

At the time of data reproduction, the reproduced clock (clock as a reference for decode processing) generated by the PLL within the reader/writer circuit 5 serves as the information on the current rotational speed of the spindle motor 2. Hence, the spindle servo circuit 12 can also generate the spindle error signal by comparing this information with the predetermined CLV reference speed information.

The spindle servo circuit 12 then outputs a spindle drive signal generated according to the spindle error signal to thereby perform the CLV rotation of the spindle motor 2.

Further, the spindle servo circuit 12 generates a spindle drive signal in response to a spindle kick/brake control signal from the system controller 10 to thereby perform operations such as starting, stopping, accelerating, and decelerating the spindle motor 2.

The various operations of the servo system and the recording and reproducing system as described above are controlled by the system controller 10 formed by a microcomputer.

The system controller 10 performs various processing in response to commands from the AV system 20.

For example, when a write command is issued from the AV system 20, the system controller 10 first moves the optical pickup 1 to an address where writing is to be performed. Then the system controller 10 makes the ECC encoder/decoder 7 and the modulating and demodulating circuit 6 subject data (such as audio data and video data of various systems such for example as MPEG2) transferred from the AV system 20 to the encode processing as described above. A laser drive pulse is then supplied from the reader/writer circuit 5 to the laser driver 13 as described above, whereby recording is performed.

When a read command requesting transfer of certain data (MPEG2 video data or the like) recorded on the disk 100 is supplied from the AV system 20, for example, the system controller 10 first effects seek operation control aiming at an address specified. Specifically, the system controller 10 issues a command to the servo circuit 11 to effect access operation of the optical pickup 1 targeting the address specified by a seek command.

Then, the system controller 10 effects operation control necessary to transfer data of the specified data section to the AV system 20. Specifically, the system controller 10 effects reading of the data from the disk 100, effects decoding/buffering and the like in the reader/writer circuit 5, the modulating and demodulating circuit 6, and the ECC encoder/decoder 7, and then transfers the requested data.

At the time of recording and reproduction of the data by phase change marks, the system controller 10 controls access and recording and reproducing operation using ADIP addresses detected by the wobble circuit 8 and the address decoder 9.

Also, at a predetermined time such as a time of loading of the disk 100 or the like, the system controller 10 effects reading of prerecorded information recorded as a wobbling groove in the PB zone of the disk 100.

In this case, the system controller 10 first effects seek operation control aiming at the PB zone. Specifically, the system controller 10 issues a command to the servo circuit 11 to make the pickup 1 access the innermost circumference side of the disk.

Then, the system controller 10 makes the pickup 1 perform reproduction tracing, thereby obtains a push-pull signal as reflected light information, effects decode processing by the wobble circuit 8, the reader/writer circuit 5, and the ECC encoder/decoder 7, and then obtains reproduced data as the prerecorded information.

On the basis of the prerecorded information thus read, the system controller 10 performs laser power setting, copy protect processing and the like.

At the time of reproduction of the prerecorded information in the PB zone, the system controller 10 controls access and reproducing operation using address information included in a BIS cluster of the read prerecorded information.

While the disk drive apparatus in the example of FIG. 22 is connected to the AV system 20, the disk drive apparatus according to the present invention may be connected to for example a personal computer or the like.

Further, there can be an embodiment in which the disk drive apparatus is not connected to another apparatus. In such a case, an operation unit and a display unit are provided, and the configuration of an interface part for data input and output is different from that of FIG. 22. That is, it suffices to perform recording and reproduction in response to an operation by a user and form a terminal part for inputting and outputting various data.

Of course, various other configuration examples are conceivable; for example, an example as a recording-only apparatus or a reproduction-only apparatus is conceivable.

A method of MSK demodulation for a push-pull signal as ADIP information in the wobble circuit 8 will be described with reference to FIG. 23 and FIGS. 24A to 24G.

Figure 23:
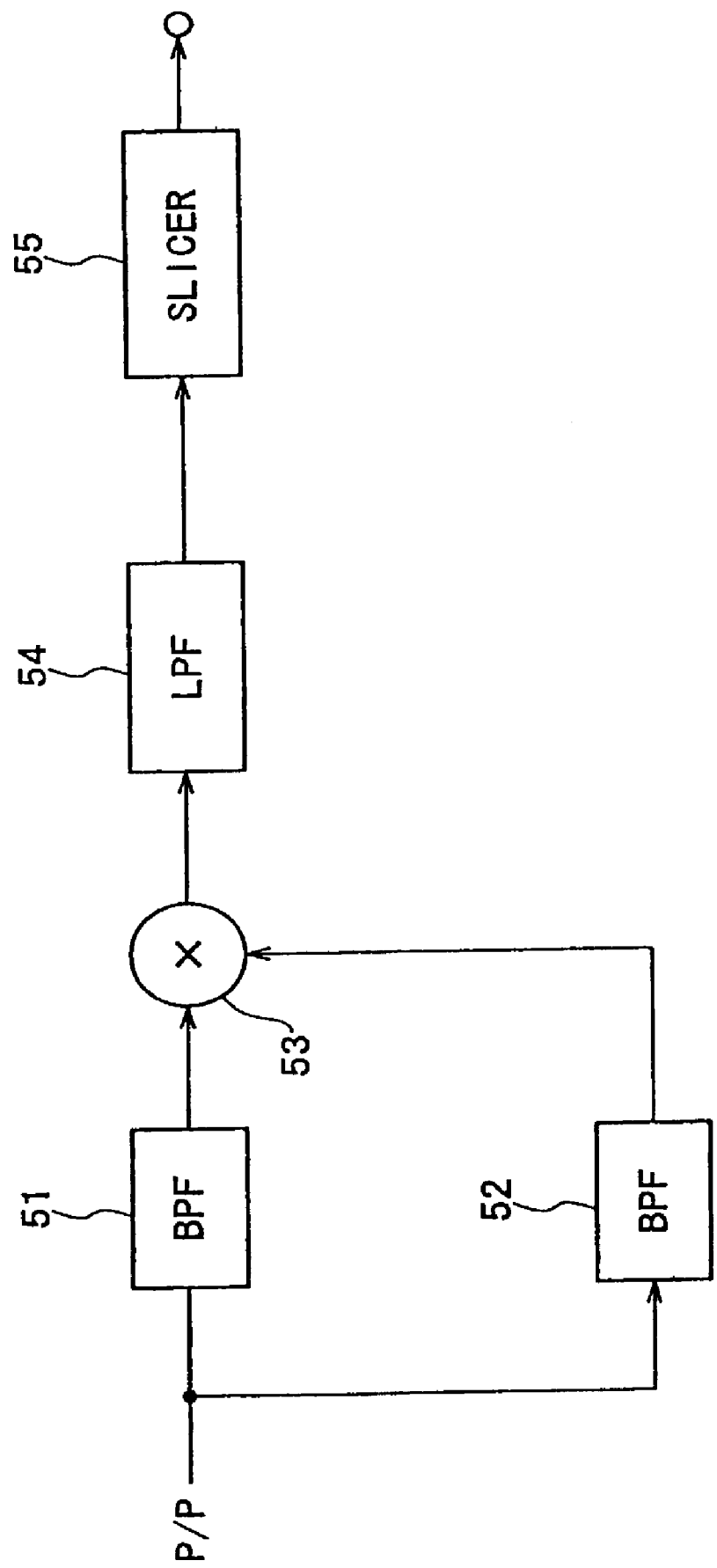
FIG. 23 is a block diagram of an MSK demodulation unit of the disk drive apparatus according to the embodiment.

As shown in FIG. 23, as a configuration for MSK demodulation, the wobble circuit 8 has band-pass filters (BPF) 51 and 52, a multiplier 53, a low-pass filter (LPF) 54, and a slicer 55.

As described above, address data as ADIP information as shown in FIG. 24A, for example, is converted into precoded data subjected to differential encoding as shown in FIG. 24B, and then subjected to MSK modulation as shown in FIG. 24C. On the basis of the MSK modulated signal, the groove is wobbled on the disk.

Therefore, information obtained as a push-pull signal at the time of recording and reproduction in the RW zone of the disk 100 is a signal corresponding to the MSK modulated waveform of FIG. 24C.

A push-pull signal P/P supplied as a signal related to wobbling from the matrix circuit 9 in FIG. 22 is supplied to each of the band-pass filters 51 and 52 in FIG. 23.

The band-pass filter 51 has a characteristic of passing bands corresponding to a carrier frequency and a frequency 1.5 times the carrier frequency. The band-pass filter 51 extracts a wobble component, that is, the MSK modulated wave of FIG. 24C.

The band-pass filter 52 has a narrower-band characteristic of passing only a carrier frequency component. The band-pass filter 52 thus extracts the carrier component of FIG. 24D.

The multiplier 53 multiplies the outputs of the band-pass filters 51 and 52 together. That is, synchronous detection can be performed by multiplying the MSK modulated wobble signal and the carrier together, whereby a demodulated signal demod out of FIG. 24E is obtained.

The demodulated signal demod out is passed through the next LPF 54, whereby an LPF out signal of FIG. 24F is obtained.

The LPF 54 is for example a 27-tap FIR filter with the following coefficients:
−0.000640711
−0.000865006
0.001989255
0.009348803
0.020221675
0.03125
0.040826474
0.050034929
0.05852149
0.065960023
0.072064669
0.076600831
0.079394185
0.080337385; Center
0.079394185
0.076600831
0.072064669
0.065960023
0.05852149
0.050034929
0.040826474
0.03125
0.020221675
0.009348803
0.001989255
−0.000865006
−0.000640711

The LPF out signal obtained from the LPF 54 is binarized by the slicer 55 formed as a comparator, whereby demodulated data (demod data) of FIG. 24G is obtained.

The demodulated data (demod data) as a binarized output is channel bit data forming address information. The demodulated data is supplied to the address decoder 9 shown in FIG. 22, so that an ADIP address is decoded.

3. Disk Manufacturing Method

A method of manufacturing the disk according to the present embodiment described above will next be described.

A disk manufacturing process is roughly divided into a so-called mastering process and a replication process. The mastering process covers steps up to completion of a metallic master (stamper) used in the replication process. The replication process mass-produces duplicate optical disks using the stamper.

Specifically, the mastering process performs so-called cutting in which a photoresist is coated on a polished glass substrate, and pits and grooves are formed by exposing the photosensitive film to a laser beam.

In the case of the present embodiment, a groove wobbling on the basis of prerecorded information is cut in a portion corresponding to the PB zone on the innermost circumference side of the disk, and a groove wobbling on the basis of ADIP addresses is cut in a portion corresponding to the RW zone.

The prerecorded information to be recorded is prepared in a preparatory process referred to as premastering.

After the cutting is completed, predetermined processing such as development and the like is performed, and then information is transferred onto a metallic surface by electroforming, for example, to create a stamper required when replicating the disk.

Then, the information is transferred onto a resin substrate by an injection method, for example, using the stamper, a reflective film is formed thereon, and thereafter processing of machining into a required disk shape and the like is performed, whereby a final product is completed.

Figure 25:
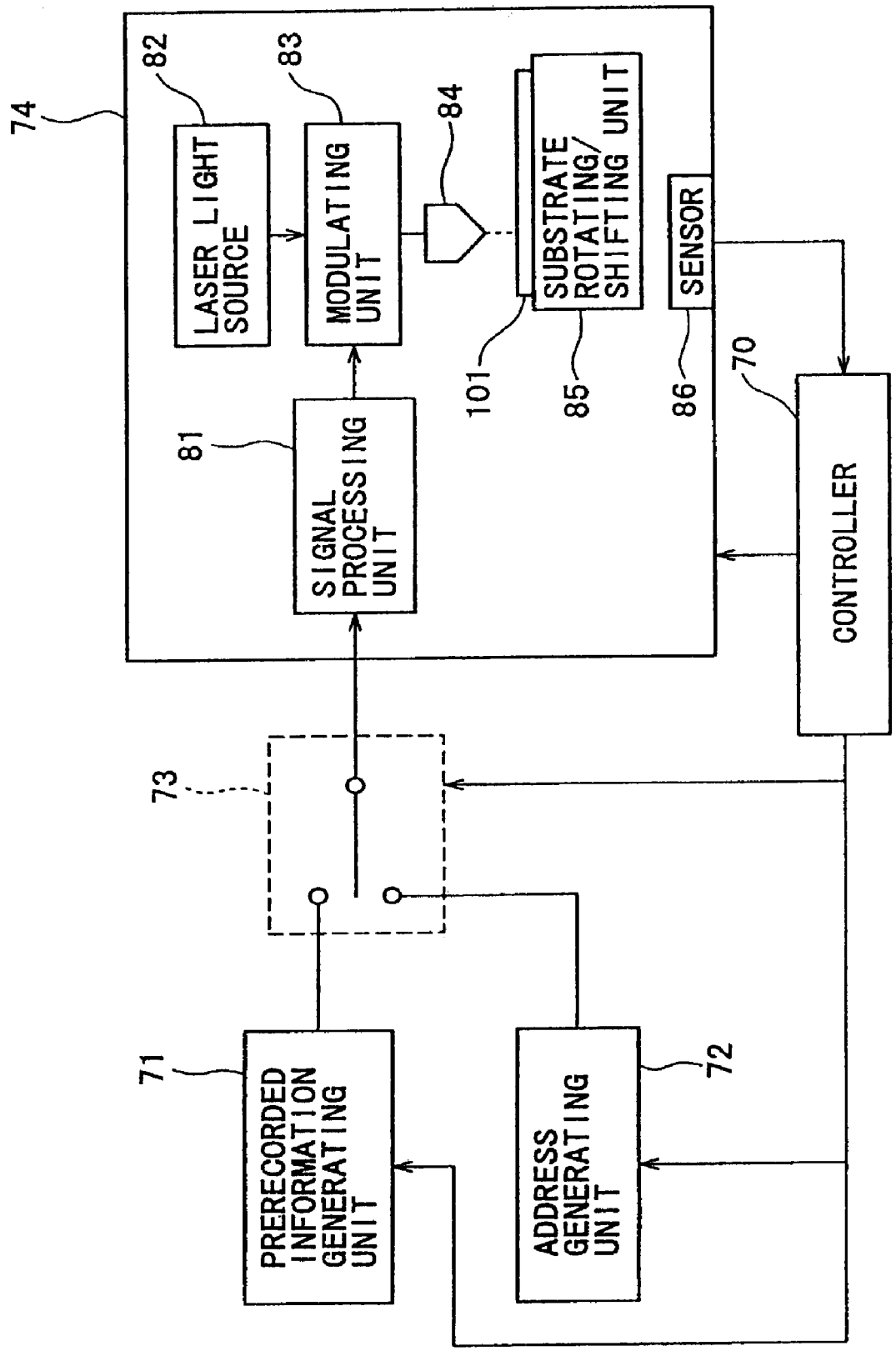
FIG. 25 is a block diagram of a cutting apparatus for producing the disk according to the embodiment.

As shown in FIG. 25, for example, a cutting apparatus has a prerecorded information generating unit 71, an address generating unit 72, a switch unit 73, a cutting unit 74, and a controller 70.

The prerecorded information generating unit 71 outputs the prerecorded information prepared in the premastering process.

The address generating unit 72 sequentially outputs values as absolute addresses.

The cutting unit 74 includes: an optical unit (a laser light source 82, a modulating unit 83, and a cutting head unit 84) for irradiating a photoresist-coated glass substrate 101 with a laser beam and thereby performing cutting; a substrate rotating/shifting unit 85 for rotation driving and slide shifting of the glass substrate 101; a signal processing unit 81 for converting input data to recording data and supplying the recording data to the optical unit; and a sensor 86 for enabling determination of whether a cutting position is in the PB zone or in the RW zone from a position of the substrate rotating/shifting unit 85.

The optical unit includes: a laser light source 82 formed by an He—Cd laser, for example; a modulating unit 83 for modulating light emitted from the laser light source 82 on the basis of the recording data; and a cutting head unit 84 for condensing the modulated beam from the modulating unit 83 and irradiating a photoresist surface of the glass substrate 101 with the modulated beam.

The modulating unit 83 includes: an acoustooptic type optical modulator (AOM) for turning on/off the light emitted from the laser light source 82; and an acoustooptic type optical deflector (AOD) for deflecting the light emitted from the laser light source 82 on the basis of a wobble generating signal.

The substrate rotating/shifting unit 85 comprises: a rotating motor for rotation-driving the glass substrate 101; a detecting unit (FG) for detecting rotational speed of the rotating motor; a slide motor for sliding the glass substrate 101 in a direction of the radius of the glass substrate 101; and a servo controller for controlling the rotational speed of the slide motor and the rotating motor, tracking of the cutting head unit 84 and the like.

The signal processing unit 81 performs formatting processing for adding for example error correction codes and the like to the prerecorded information and address information supplied via the switch unit 73, for example, and thereby forming input data, and performs modulating signal generating processing for subjecting the formatted data to predetermined calculation processing and thereby forming a modulating signal.

The signal processing unit 81 also performs driving processing for driving the optical modulator and the optical deflector of the modulating unit 83 on the basis of the modulating signal.

At the time of cutting, the substrate rotating/shifting unit 85 in the cutting unit 74 rotation-drives the glass substrate 101 at a constant linear velocity and slides the glass substrate 101 while rotating the glass substrate 101 so that a spiral track is formed at a predetermined track pitch.

At the same time, the light emitted from the laser light source 82 is converted via the modulating unit 83 into a modulated beam on the basis of the modulating signal from the signal processing unit 81, and then applied from the cutting head unit 84 to the photoresist surface of the glass substrate 71. As a result, the photoresist is exposed to light on the basis of the data and grooves.

The controller 70 controls performance of operation at the time of such cutting by the cutting unit 74, and controls the prerecorded information generating unit 71, the address generating unit 72, and the switch unit 73 while monitoring a signal from the sensor 86.

At the time of a start of cutting, the controller 70 sets a slide position of the substrate rotating/shifting unit 85 to an initial position so that the cutting head unit 84 of the cutting unit 74 starts laser irradiation at an innermost circumference side. Then the controller 70 makes the substrate rotating/shifting unit 85 start rotation-driving the glass substrate 101 at a CLV and sliding the glass substrate 101 to form a groove with a track pitch of 0.35 µm.

In this state, the controller 70 makes the prerecorded information generating unit 71 output prerecorded information and supply the prerecorded information to the signal processing unit 81 via the switch unit 73. Further, the controller 70 starts laser output from the laser light source 82, and the modulating unit 83 modulates the laser light on the basis of the modulating signal, or an FM code modulating signal of the prerecorded information, from the signal processing unit 81, whereby the groove is cut into the glass substrate 101.

Thereby the groove as shown in FIG. 3B is cut in a region corresponding to the PB zone.

When the controller 70 thereafter detects from the signal of the sensor 86 that the cutting operation has advanced to a position corresponding to the PB zone, the controller 70 switches the switch unit 73 to the address generating unit 72 side, and instructs the address generating unit 72 to sequentially generate address values.

Also, the controller 70 lowers the sliding speed of the substrate rotating/shifting unit 85 so as to form a groove with a track pitch of 0.32 µm.

Thereby the address information is supplied from the address generating unit 72 to the signal processing unit 81 via the switch unit 73. Then the laser light from the laser light source 82 is modulated in the modulating unit 83 on the basis of the modulating signal, or an MSK modulating signal of the address information, from the signal processing unit 81. The groove is cut into the glass substrate 101 by the modulated laser light.

Thereby the groove as shown in FIG. 3A is cut in a region corresponding to the RW zone.

When the controller 70 detects from the signal of the sensor 86 that the cutting operation has reached an end of the readout zone, the controller 70 ends the cutting operation.

As a result of such operation, a portion exposed to light which portion corresponds to the wobbling grooves of the PB zone and the RW zone is formed on the glass substrate 101.

Thereafter development, electroforming and the like are performed to create a stamper, and the above-described disk is manufactured using the stamper.

While the disk according to the embodiment, and the disk drive apparatus and the disk manufacturing method provided for the disk have been described above, the present invention is not limited to these examples and various modifications thereof can be considered without departing from the scope of the subject matter.

INDUSTRIAL APPLICABILITY

As described above, with the disk recording medium, the disk drive apparatus, the reproducing method, and the disk manufacturing method according to the present invention, the disk recording medium is suitable as a large-capacity disk recording medium, and great effects are obtained in that the disk drive apparatus is improved in recording and reproducing operation performance and the wobble processing circuit system may be a simple one.

The invention claimed is:

1. A method of recording data on a disk, comprising:
receiving two sectors of user data, each sector including 2048 bytes;
error-correction coding the received user data using a long distance code (LDC) to form an LDC block having 19 columns with 216 rows of data and 32 rows of parity information;
receiving two units of user control data, each unit including 24 bytes;
forming an access block from the user control data and address data, the access block having four columns and 30 rows;
error-correction coding the access block using a burst indicator subcode (BIS) to form a BIS block having four columns with 30 rows of data and 32 rows of parity information, wherein the step of error-correction coding the received user data includes
adding a 4-byte error detection code to each sector of the user data to form a data frame;
scrambling the data frame to form a scrambled data frame;
forming a data block having 19 columns and 216 rows from the scrambled data frame; and
forming the LDC block by adding the 32 rows of the parity information to the data block;
forming a BIS cluster form the BIS block, the BIS cluster having one column and 248 rows;
forming a cluster having 20 columns and 248 rows by alternating a block of ten columns of the LDC block, one column of the BIS cluster, and nine columns of the LDC block; and
recording the cluster in a reproduction-only zone on the disk.

2. The method of claim 1, wherein the step of recording the cluster comprises:
reading the cluster row by row in a horizontal direction; and
inserting sync data into each row to form a recording frame having 168 bits.

3. A recording apparatus for recording data on a disk, comprising:
an Error-Correction Code (ECC) encoder configured to
receive two sectors of user data, each sector including 2048 bytes;
error-correction code the received user data using a long distance code (LDC) to form an LDC block having 19 columns with 216 rows of data and 32 rows of parity information;
receive two units of user control data, each unit including 24 bytes;
form an access block from the user control data and address data, the access block having four columns and 30 rows;
error-correction code the access block using a burst indicator subcode (BIS) to form a BIS block having four columns with 30 rows of data and 32 rows of parity information, wherein in the error-correction coding, the encoder is configured to:
add a 4-byte error detection code to each sector of the user data to form a data frame;
scramble the data frame to form a scrambled data frame;
form a data block having 19 columns and 216 rows from the scrambled data frame; and
form the LDC block by adding the 32 rows of the parity information to the data block;
form a BIS cluster form the BIS block, the BIS cluster having one column and 248 rows; and
form a cluster having 20 columns and 248 rows by alternating a block of ten columns of the LDC block, one column of the BIS cluster, and nine columns of the LDC block; and
means for recording the cluster in a reproduction-only zone on the disk.

4. A non-transitory disk recording medium, comprising:
a groove formed in a spiral fashion to form a track on the disk recording medium;
a recording and reproducing area in which address information is recorded by wobbling of said groove and the track formed by said groove is used for recording and reproducing mark information; and
a reproduction-only area in which prerecorded information is recorded by wobbling of said groove,
wherein a plurality of recording frames are recorded in the reproduction-only area, each recording frame consisting of a frame synchronization byte and 20 bytes of data consisting of ten bytes of long distance code (LDC) data, one byte of BIS data, followed by nine bytes of the LDC data.

5. The disk recording medium of claim 4, wherein each recording frame consists of 168 bits.

* * * * *